US008229434B2

(12) United States Patent
Kazmi et al.

(10) Patent No.: US 8,229,434 B2
(45) Date of Patent: Jul. 24, 2012

(54) USING MOBILITY STATISTICS TO ENHANCE TELECOMMUNICATIONS HANDOVER

(75) Inventors: Muhammad Kazmi, Bromma (SE);
Konstantinos Dimou, Stockholm (SE);
Bengt Lindoff, Bjäred (SE); Walter Müller, Upplands Väsby (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 12/475,953

(22) Filed: Jun. 1, 2009

(65) Prior Publication Data

US 2010/0120429 A1        May 13, 2010

Related U.S. Application Data

(60) Provisional application No. 61/112,954, filed on Nov. 10, 2008.

(51) Int. Cl.
*G06F 15/16* (2006.01)
(52) U.S. Cl. ....................................... 455/436; 455/574
(58) Field of Classification Search .................. 455/436, 455/437, 450, 574
See application file for complete search history.

(56) References Cited

U.S. PATENT DOCUMENTS

| | | | |
|---|---|---|---|
| 2008/0090573 A1 | 4/2008 | Kim et al. | |
| 2008/0160918 A1 | 7/2008 | Jeong et al. | |
| 2008/0167089 A1 | 7/2008 | Suzuki et al. | |

FOREIGN PATENT DOCUMENTS

| | | |
|---|---|---|
| WO | 2008/082347 A1 | 7/2008 |
| WO | 2008/086649 A1 | 7/2008 |

OTHER PUBLICATIONS

R4-082491, "Performance of Mobility State Detection based Cell Reselection-Further Simulation Results", 3GPP RAN 4, Meeting #48bis, Sep. 2008, Edinburgh, UK.
3GPP TS 36.304, "3rd Generation Partnership Project; Technical Specification Group Radio Access Network; Evolved Universal Terrestrial Radio Access (E-UTRA); User Equipment (UE) procedures in idle mode (Release 8)", version 8.2.0, May 2008.
R4-082995, "Performance of Mobility State Detection Based Cell Reselection-Simulation Results with DRX Cycle 1.28 sec", 3GPP TSG-RAN WG4 Meeting #49, Prague Czech Republic, Nov. 10-14, w008, published Nov. 3, 2008.
Kurjenniemi et al, "Effect of Measurement Bandwidth to the Accuracy of Inter-Frequency RSR{ Measurements in LATE", Proc. Of the IEEE Symposium on Personal, Indoor and Mobile Radio Communications, Cannes, France, Sep. 15-18, 2008.
International Search Report mailed Mar. 30, 2010 in corresponding PCT application PCT/SE2009/050911.
3GPP_TS_RAN_WG4 Archives—Sep. 2008 (#95); http://list.etsi.org/scripts/wa.exe?A2=ind0809&L=3gpp_tsg_ran_wg4&T=0 &P=12171, 2008.

*Primary Examiner* — Sam Bhattacharya
(74) *Attorney, Agent, or Firm* — Nixon & Vanderhye, P.C.

(57) ABSTRACT

A method of operating a communications network (20) comprising a wireless terminal (30) which communicates with a network node (22) comprises using the wireless terminal (30) to perform measurements relative to plural cells of the network, and then using the wireless terminal (30) or the network node (22) to make a determination regarding an extent of connection of the wireless terminal to a best cell of the network. The method also comprises using the wireless terminal (30) or the network node (22) to select a mobility related parameter for the wireless terminal (30) in accordance with the determination.

37 Claims, 21 Drawing Sheets

USING MOBILITY STATISTICS TO ENHANCE TELECOMMUNICATIONS HANDOVER

This application claims the priority and benefit of U.S. Provisional patent application 61/112,954 filed Nov. 11, 2008, entitled "A Method and Radio Base Station In Communication Network System", which is incorporated herein by reference in its entirety.

TECHNICAL FIELD

This invention pertains to telecommunications, and particularly to enhancement of handover of a wireless terminal between cells of a radio access network.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB", "B node", or (in LTE) eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of radio access networks, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). An entity known as the Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3rd Generation Partnership Project (3GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes. The evolved UTRAN (E-UTRAN) comprises evolved base station nodes, e.g., evolved NodeBs or eNBs, providing evolved UTRA user-plane and control-plane protocol terminations toward the wireless terminal.

As those skilled in the art appreciate, in UTRAN- or WCDMA-based technology a common frequency band allows simultaneous communication between a user equipment unit (UE) and plural base stations. Therefore a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

In wireless communication networks, the mobility management is responsible for handover between the cells and for cell reselection. The handover has a strong impact on the quality of service perceived by the user, because it may generate delay to the packet transfer times as well as call or connection drop. Thus, good performance of the mobility management mechanisms is crucial in success of new radio network technologies.

When evaluating the performance of handover, a number of performance criteria can be used. A commonly used one is the percentage of failed handovers. However, the handover failures cannot be used in eliciting effective preventative actions to improve the performance, because a failure implies already dropped connection and quality degradation.

The triggers that define when the handover decision is taken influence the performance of the procedure significantly. As an example, the parameters in the case of handover in LTE network comprise the hysteresis in received signal strength and the time hysteresis before making the handover decision. In the case of cell reselection in idle mode of LTE, the parameters used in mobility handling are Qhyst and Treselection and they account for the hysteresis in the received signal strength and time hysteresis respectively.

Discontinuous Reception (DRX) mechanism is defined for LTE in both RRC_IDLE and RRC_CONNECTED modes by 3GPP and is a mechanism to save battery resources of the terminal. The terminal only needs to be active a fraction of time in the beginning of predefined cycles for receiving DL/UL assignment information. DRX in connected mode is typically used in case when a small amount of data is transmitted to the terminal (VoIP, "Pings" etc) or when there are longer inactivity periods between downloads in web access. With DRX, the UE can turn on and off reception of L1/L2 control in RRC_CONNECTED state. None of the mobility related measurements is done when the terminal is in DRX. Thus, the length of DRX cycle has also impact on the handover performance.

Some proposals for improving handover performance exist already, a few of which are listed below:
- Adapting the DRX cycle when an event is detected (WO 2008/082347 by Kazmi M et al. and US 2008/0160918 A1 by Kyeong-In Jeong, Van Lieshout, et al.).
- Adapting DRX Cycle in function of absolute values of received signal strength (e.g. If RSS below a threshold), or RSS difference between serving and target cell (US 2008/0160918 A1 by Kyeong-In Jeong, Van Lieshout, et al.).

Adapting of DRX cycle in function of the observed traffic statistics and HARQ feedback (20080167089 A1 89)

Exchange of DRX information during HO between serving and target cell (WO 2008086649 A1). Resuming the use of DRX from target cell after the serving cell transmits a HO command (US 20080090573 A1).

Adapting the layer 3 criteria so as to adjust timers controlling RLF recovery, on the basis of L3 criteria, which are available, scaled by DRX cycles The UE estimates a suggested DRX cycle and notifies the network. As a by-product of the suggested DRX cycle adaptations, it is already suggested that the layer 3 filter coefficient k is adapted in function of the DRX cycle Mainly, handover is an important radio resource control procedure whose performance has a strong impact on the quality of service perceived by the user, due to the call or connection drops the handover can generate.

A number of handover performance criteria are used. A commonly used one is the percentage of failed handovers. However, the use of handover failures cannot lead to effective preventative actions, since failures imply already dropped connections.

Operators would like to maintain the target grade of service (lower blocking and dropping) and good quality of service. Therefore a number of criteria set by the operators, need to be fulfilled. In real network the desired grade of service can be achieved provided UE is connected or camped on to the best cell most of the time. This ensures high reception level or SINR, which in turn improves user bit rate and improvement in overall performance. But due to varying radio conditions and UE mobility it is though challenging though important that connection to the best cell is retained.

SUMMARY

In one of its aspect the technology disclosed herein concerns a method of operating a communications network comprising a wireless terminal which communicates with a network node. In its generic form the method comprises using the wireless terminal to perform measurements relative to plural cells of the network; and then using the wireless terminal or the network node to make a determination regarding an extent of connection of the wireless terminal to a best cell of the network.

As a further feature an example mode of the method also comprises using the wireless terminal or the network node to select a mobility related parameter for the wireless terminal in accordance with the determination. For example, the mobility related parameter can be a mobility management parameter. Accordingly, yet a further example mode of the method comprises using the mobility management parameter to define when a handover decision is made.

In an example mode the method further comprises selecting plural mobility management parameters for the wireless terminal in accordance with the determination. For example, two mobility management parameters can comprise hysteresis of a signal value and time hysteresis before making a handover decision.

In an example mode, the act of selecting the mobility management parameter can comprise changing a value of at least one of the hysteresis of a signal value and the time hysteresis before making a handover decision, followed by an act of changing a length of a discontinuous reception (DRX) cycle.

In an example mode of the method the mobility management parameter is a hysteresis value. For example, the mobility management parameter can comprises hysteresis in received signal strength or time hysteresis before making a handover decision.

The mobility related parameters can comprise not only one or more mobility management parameters, but also a parameter of a discontinuous reception (DRX) cycle, e.g., length of a discontinuous reception (DRX) cycle.

In an example mode, the wireless terminal makes the determination to change the mobility related parameter. When the mobility related parameter is discontinuous reception (DRX), in an example mode the wireless terminal can determine to progressively change length of the discontinuous reception (DRX) in accordance with the determination. In another example mode, the network node can configure the wireless terminal with plural discontinuous reception (DRX) cycle values, and the wireless terminal changes between the plural discontinuous reception (DRX) cycle values in accordance with the determination.

Other examples of the mobility management parameters include one or more of (1) filter length of measurements; and (2) periodicity with which measurements of signal strength received from a pilot signal is performed.

In an example mode the act of making the determination of the extent of connection comprises determining whether a percentage of time that the wireless terminal is connected to a best cell of the network satisfies a threshold.

In an example mode in which the mobility management parameter is a time hysteresis before making a handover decision, and the method further comprises reducing the time hysteresis if travel speed of the wireless terminal is low. In an other example mode, wherein a travel speed of the wireless terminal is high, the method further comprises reducing the time hysteresis and increasing the received signal hysteresis.

An example mode comprises comparing a cell parameter of a serving cell with a cell parameter of one or more non-serving cells over time to obtain the percentage of the time that the wireless terminal is connected to the best cell. The cell parameter can be one of cell signal quality, cell signal strength, or a combination of cell signal quality and cell signal strength.

In an example mode a threshold value is signaled from the network node to the wireless terminal. The threshold value is then stored or configured in a memory of the wireless terminal.

An example mode comprises maintaining a performance counter at the wireless terminal (the performance counter being configured to indicate a percentage of time that the wireless terminal is connected to a best cell of the network satisfies a threshold); and resetting the performance counter upon change of the mobility related parameter. An example mode comprises requiring a lapse of time between consecutive changes of the mobility related parameter.

An example mode of the method comprises determining a traveling speed of the wireless terminal; and selecting a value of the mobility management parameter dependent upon the traveling speed.

An example mode of the method comprises storing at the network node a table configured to map various traveling speeds to corresponding values of the mobility related parameter.

An example mode the method further comprises estimating the mobility related parameter at the wireless terminal in accordance with the determination.

An example mode of the method comprises the network node broadcasting differing mobility related parameter values corresponding to differing percentages of time values that the wireless terminal is not connected to the best cell.

In an example mode, when the wireless terminal is in idle mode, the wireless terminal makes a random access request and upon granting of the random access request, transmits a measurement report to the network node regarding the extent of connection of the wireless terminal to the best cell of the network.

Another aspect of the technology disclosed herein concerns a node of a communications network which communicates with a wireless terminal. In an example embodiment the node comprises an interface with the wireless terminal (by which the node receives measurements relative to plural cells of the network) and a computer configured to make a determination regarding an extent of connection of the wireless terminal to a best cell of the network. In some example embodiments the node is a base station node; in other example embodiments the node is a radio network controller node.

In an example embodiment the node comprises a mobility related parameter input unit configured to select a mobility related parameter for the wireless terminal in accordance with the determination. In some example embodiments the mobility related parameter is a mobility management parameter.

In an example embodiment the node further comprises a handover unit configured to use the mobility management parameter to define when a handover decision is made.

In an example embodiment the mobility related parameter input unit is configured to select plural mobility management parameters for the wireless terminal in accordance with the determination. For example, two mobility management parameters can comprise hysteresis of a signal value and time hysteresis before making a handover decision.

In an example embodiment, the mobility related parameter input unit is configured to change a value of at least one of the hysteresis of a signal value and the time hysteresis before making a handover decision, and then to change a length of a discontinuous reception (DRX) cycle.

In some example embodiments the mobility related parameter is a mobility management parameter which takes the form of a hysteresis value. For example, the mobility management parameter can comprise hysteresis in received signal strength or time hysteresis before making a handover decision. In some example embodiments the mobility related parameter comprises a parameter of a discontinuous reception (DRX) cycle, e.g., length of a discontinuous reception (DRX) cycle.

In an example embodiment, the mobility related parameter input unit is further configured to provide the wireless terminal with plural discontinuous reception (DRX) cycle values so that the wireless terminal can change between the plural discontinuous reception (DRX) cycle values in accordance with the determination.

In an example embodiment the mobility management parameter comprises one or more of (1) filter length of measurements; and (2) periodicity with which measurements of signal strength received from a pilot signal is performed.

In an example embodiment the computer of the node is configured to make the determination of the extent of connection by determining whether a percentage of time that the wireless terminal is connected to a best cell of the network satisfies a threshold.

In one example embodiment the mobility management parameter is a time hysteresis before making a handover decision, and the mobility related parameter input unit is configured to reduce the time hysteresis if travel speed of the wireless terminal is low.

In another example embodiment wherein there are plural mobility management parameters (including a time hysteresis and a hysteresis of a received signal), the mobility related parameter input unit is configured to reduce the time hysteresis and increase the received signal hysteresis when a travel speed of the wireless terminal is high.

In an example embodiment the computer of the node is configured to compare a cell parameter of a serving cell with a cell parameter of one or more non-serving cells over time to obtain the percentage of the time that the wireless terminal is connected to the best cell. The cell parameter can be one of cell signal quality, cell signal strength, or a combination of cell signal quality and cell signal strength.

In an example embodiment the node further comprises a signal handler configured to signal the threshold from the network node to the wireless terminal.

In an example embodiment the node further comprises a wireless terminal speed determination unit configured to determine a traveling speed of the wireless terminal. The mobility related parameter input unit is configured to select a value of the mobility management parameter dependent upon the traveling speed. In an example embodiment the node further comprises a table memory configured to store a table configured to map various traveling speeds to corresponding values of the mobility related parameter.

In an example embodiment the node further comprises a signal handler configured to broadcast differing mobility related parameter values corresponding to differing percentages of time values that the wireless terminal is not connected to the best cell.

In another of its aspects the technology disclosed herein concerns a wireless terminal which communicates with a network node of a communications network. In its generic form the wireless terminal comprises a measurement unit (configured to perform measurements relative to plural cells of the network) and a computer configured to make a determination regarding an extent of connection of the wireless terminal to a best cell of the network.

In an example embodiment the wireless terminal further comprises a mobility related parameter input unit configured to select a mobility related parameter for the wireless terminal in accordance with the determination.

In an example implementation, the mobility related parameter is a mobility management parameter, and the mobility related parameter input unit is further configured to select plural mobility management parameters for the wireless terminal in accordance with the determination. Examples of two mobility management parameters comprise hysteresis of a signal value and time hysteresis before making a handover decision.

In an example embodiment the mobility related parameter input unit of the wireless terminal is configured to select the mobility management parameter by changing a value of at least one of the hysteresis of a signal value and the time hysteresis before making a handover decision, and then to change a length of a discontinuous reception (DRX) cycle. In an example embodiment the mobility related parameter can be a mobility management parameter, and in particular can be a hysteresis value such as hysteresis in received signal strength or time hysteresis before making a handover decision.

In an example embodiment the mobility related parameter comprises a parameter of a discontinuous reception (DRX) cycle, such as (for example) length of a discontinuous reception (DRX) cycle. In an example implementation, the mobility related parameter input unit is configured to progressively change length of the discontinuous reception (DRX) in accordance with the determination. In another example implementation, the wireless terminal is configured to receive plural discontinuous reception (DRX) cycle values from the network node, and the mobility related parameter input unit is configured to change between the plural discontinuous reception (DRX) cycle values in accordance with the determination.

In example embodiments in which the mobility related parameter is a mobility management parameter, and the mobility management parameter can also comprise (for example) one or more of (1) filter length of measurements; and (2) periodicity with which measurements of signal strength received from a pilot signal is performed.

In an example embodiment the computer of the wireless terminal is configured to make the determination of the extent of connection by determining whether a percentage of time that the wireless terminal is connected to a best cell of the network satisfies a threshold.

In an example embodiment wherein the mobility management parameter is a time hysteresis before making a handover decision, and the mobility related parameter input unit can be configured to reduce the time hysteresis if travel speed of the wireless terminal is low.

In example embodiments in which there are plural mobility management parameters, including a time hysteresis and a hysteresis of a received signal; the mobility related parameter input unit can be configured to reduce the time hysteresis and increase the received signal hysteresis when a travel speed of the wireless terminal is high.

In an example embodiment, the computer of the wireless terminal is configured to compare a cell parameter of a serving cell with a cell parameter of one or more non-serving cells over time to obtain the percentage of the time that the wireless terminal is connected to the best cell. In an example implementation the cell parameter is one of cell signal quality, cell signal strength, or a combination of cell signal quality and cell signal strength.

In an example embodiment the wireless terminal receives a threshold signaled from the network node to the wireless terminal. In such example embodiment the wireless terminal further comprises a memory configured to store the threshold received from the network node.

In an example embodiment the wireless terminal further comprises a performance counter memory. The performance counter memory is configured to indicate a percentage of time that the wireless terminal is connected to a best cell of the network satisfies a threshold. The mobility related parameter input unit is configured to reset the performance counter upon change of the mobility related parameter.

In an example embodiment the mobility related parameter input unit of the wireless terminal is configured to estimate the mobility related parameter in accordance with the determination.

In an example embodiment the wireless terminal is configured, when in idle mode, to make a random access request and, upon granting of the random access request, to transmit a measurement report to the network node regarding the extent of connection of the wireless terminal to the best cell of the network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 1:
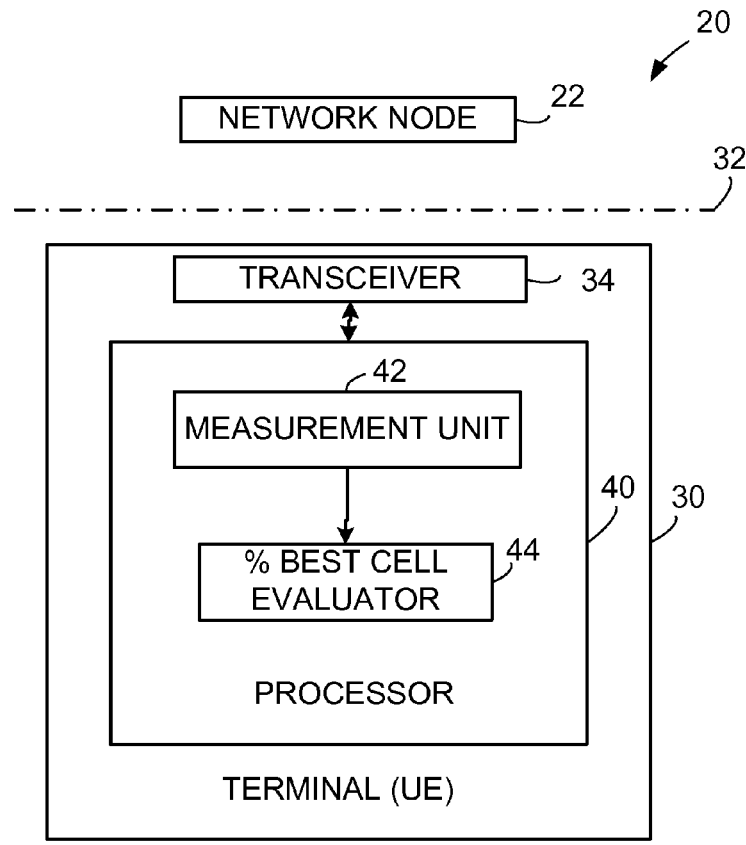
FIG. 1 is a schematic view of an example communications network wherein a wireless terminal makes a determination of an extent of time that the terminal is connected to the best cell for the terminal.

FIG. 1 shows an example communications network 20 comprising network node 22 which communicates with wireless terminal 30. As explained subsequently, in some example implementations the communications network 20 is a radio access network (RAN) and network node 22 takes the form of a radio network controller node (RNC). In other example embodiments such as LTE implementations the network node 22 can instead take the form of a radio base station or eNodeB. The wireless terminal 30 can be a mobile station or user equipment unit (UE) such as a mobile telephone ("cellular" telephone) and or a laptop with wireless capability, e.g., mobile termination, and thus can be, for example, portable, pocket, hand-held, computer-included, or car-mounted mobile devices which communicate voice and/or data with radio access network. In various drawings the wireless terminal 30 is illustrated as or referred to as a "UE". The wireless terminal 30 communicates over a radio or air interface 32 with communications network 20. Typically the network node 22 is in communication with many wireless terminals, but for sake of simplicity only one such wireless terminal 30 is shown.

FIG. 1 shows wireless terminal 30 as comprising, in its most basic form, transceiver 34 and processor 40. The transceiver 34 serves to facilitate downlink transmissions from communications network 20 to wireless terminal 30 as well as uplink transmissions from wireless terminal 30 to communications network 20. The transceiver 34 generally comprises antenna(s), amplifiers, and associated hardware elements for transmitting and receiving radio signals over radio interface 32. The processor 40 serves many purposes, including execution of instructions for enabling operation of wireless terminal 30 in conjunction with its own operation as well as transmission of signals and data over radio interface 32. For illustrating the basic aspect of the technology disclosed herein FIG. 1 shows processor 40 as comprising both measurement unit 42 and best cell evaluator 44. The measurement unit 42 serves to perform measurements relative to plural cells of network 20 (see FIG. 2). The best cell evaluator 44 serves to make a determination regarding an extent of connection of the wireless terminal to a best cell of the network.

Figure 2:
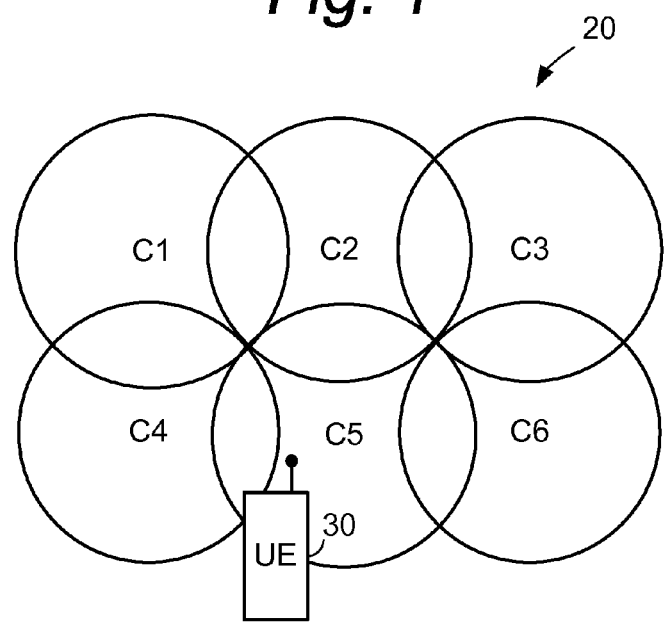
FIG. 2 is a topographical view of an example cell arrangement for a communications network

FIG. 2 depicts in topographical format portions of a cellular arrangement of communications network 20, showing specifically example cells C1-C6. A base station node is associated with each cell. FIG. 2 further shows a representative wireless terminal 30 being located within cell C5 of communications network 20. In view, e.g., of its CDMA capabilities and handover capabilities, the wireless terminal 30 monitors (e.g., measures) signals associated with each cell, e.g., pilot signals which include an identification of the cell from which they are transmitted. At the time shown in FIG. 2 it is expected that cell C5 is the best cell for wireless terminal 30, but which cell is the "best" cell can change in view of radio phenomena and/or movement of wireless terminal 30 within communications network 20.

Figure 3:
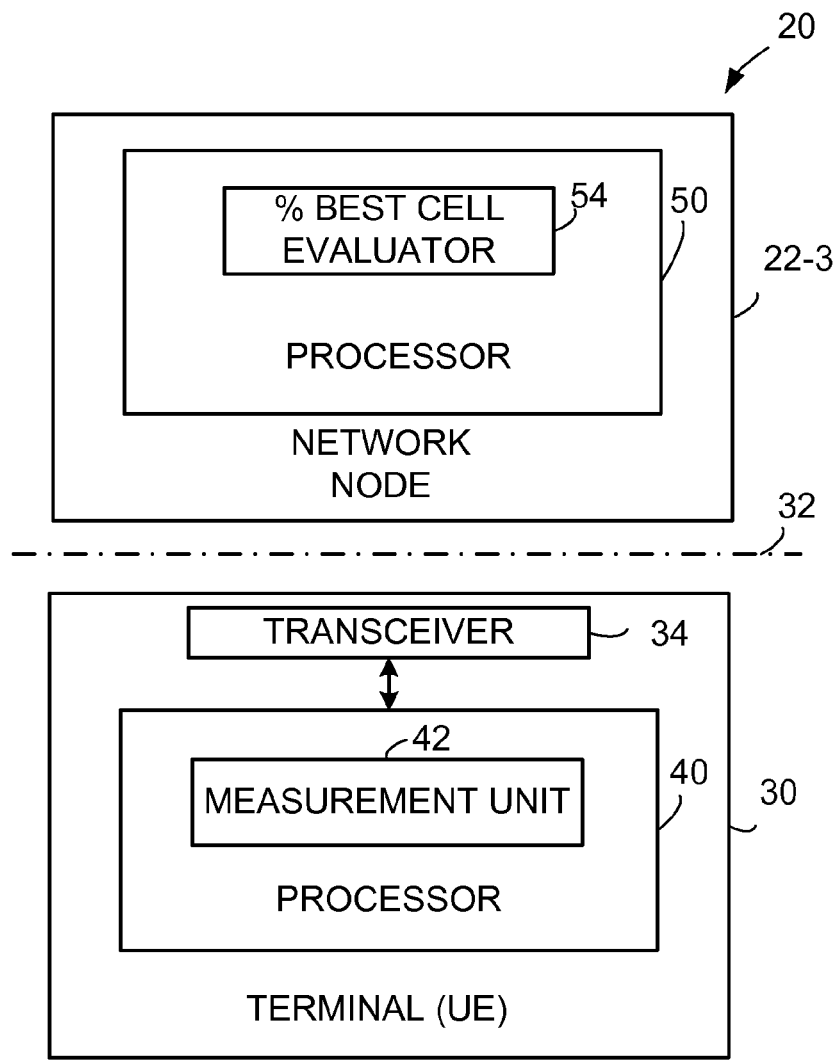
FIG. 3 is a schematic view of an example communications network wherein a network node makes a determination of an extent of time that the terminal is connected to the best cell for the terminal.

One of the aspects of the technology disclosed herein is determination of a percentage (%) of time that a terminal such as wireless terminal 30 is connected to the best cell, i.e., the cell that at the moment of measurement provides the best service/connection for wireless terminal 30. Such cell may or may not be the serving cell to which the wireless terminal 30 is presently assigned. The determination of the percentage of time that a terminal is connected to the best cell for the terminal is, in some example embodiments and example modes, performed by wireless terminal 30. For example, the best cell evaluator 44 as shown in FIG. 1 can make the determination of the percentage of time that a terminal is connected to the best cell for the terminal. In other example embodiments and modes represented generically by FIG. 3, the determination of the percentage of time that a terminal is connected to the best cell for the terminal is performed by network node 22-3. As generically representative of these other embodiments FIG. 3 shows network node 22-3 as comprising processor FIG. 50, which in turn comprises best cell evaluator 54. In the FIG. 3 embodiment the best cell evaluator 54 makes the determination of the percentage of time that a terminal is connected to the best cell for the terminal.

One of its aspects the technology disclosed herein concerns a method of operating a communications network comprising a wireless terminal which communicates with a network node. In its generic form the method comprises using the wireless terminal to perform measurements relative to plural cells of the network; and then using the wireless terminal or the network node to make a determination regarding an extent of connection of the wireless terminal to a best cell of the network.

Figure 4:
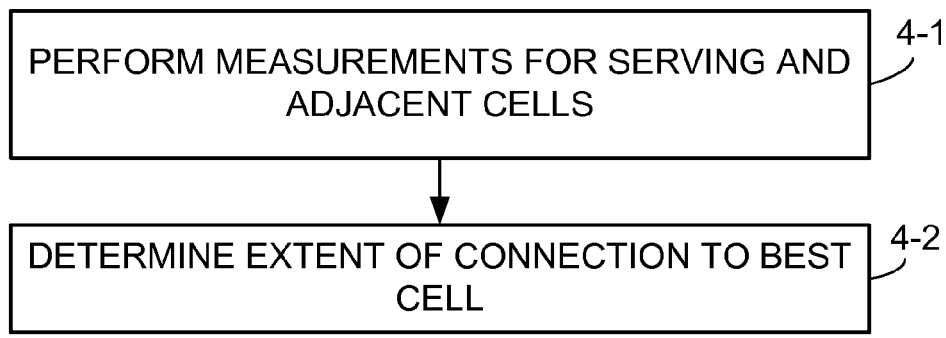
FIG. 4 is a flowchart showing basic, representative acts or steps of a method comprising making a determination of an extent of time that a terminal is connected to the best cell for the terminal.

FIG. 4 shows example representative acts or steps involved in a method according to a first aspect of the technology disclosed herein. Act 4-1 comprises the wireless terminal performing measurements relative to plural cells of the network. Act 4-2 comprises making the determination regarding an extent of connection of the wireless terminal to a best cell of the network, e.g., making the determination of the percentage of time that the terminal is connected to the best cell for the terminal. Whereas act 4-1 is performed by wireless terminal 30, in differing embodiments act 4-2 can either be performed by wireless terminal 30 (e.g., by best cell evaluator 44 in the manner illustrated by FIG. 1) or by network node 22 (e.g., by best cell evaluator 54 in the manner illustrated by FIG. 3).

Figure 1A:
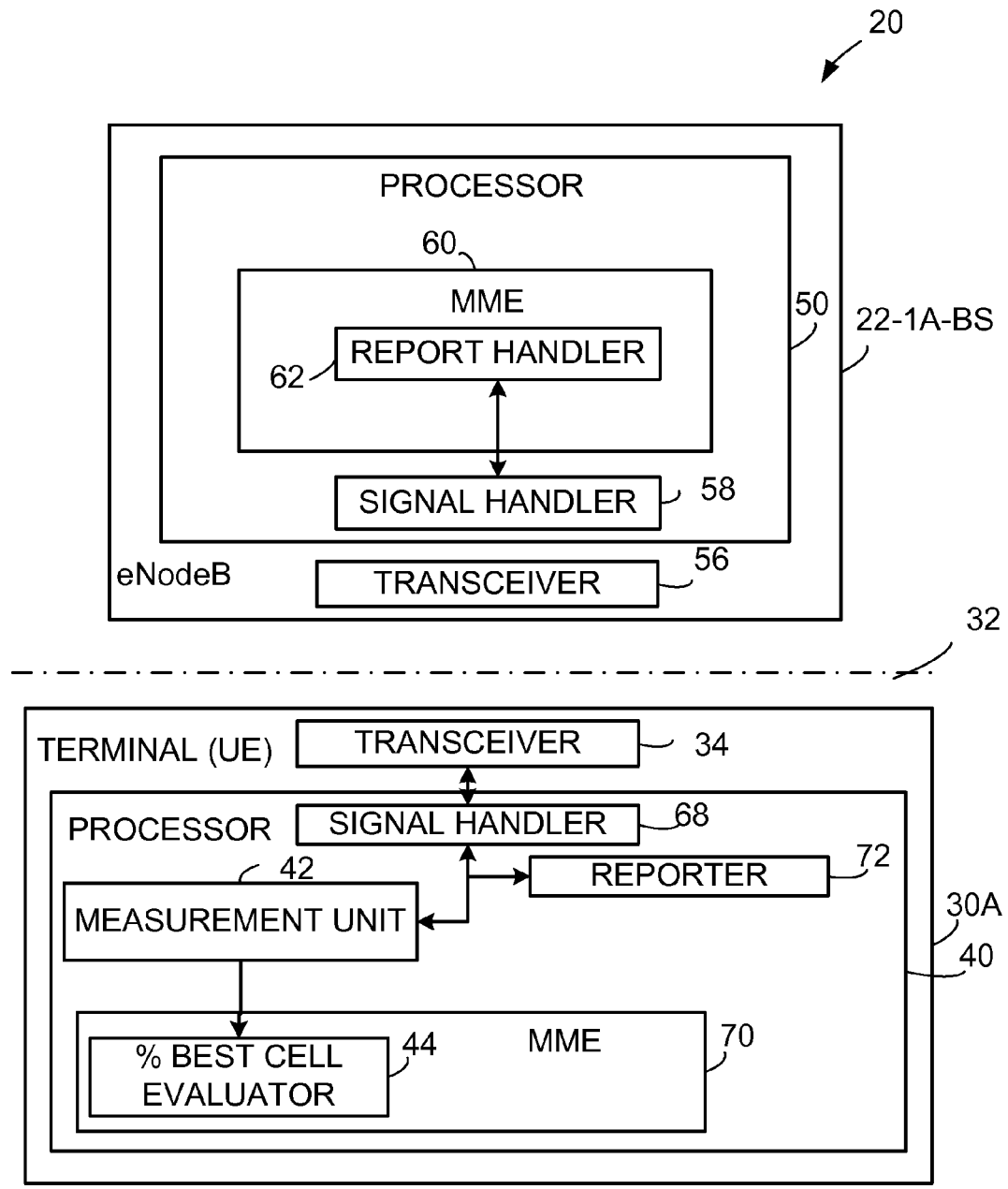

FIG. 1A illustrates in more detail example, non-limiting implementations of the network node and wireless terminal for the embodiment of FIG. 1 in a LTE environment in which network node 22-1A-BS is an eNodeB (e.g., base station node). As shown in FIG. 1A the network node 22-1A-BS comprises transceiver 56 which communicates over radio interface 32 with wireless terminal 30. The transceiver 56 typically comprises plural antenna along with associated electronics such as amplifiers, for example. FIG. 1A shows that processor 50 further comprises signal handler 58 and mobility management entity 60. FIG. 1A similarly shows that processor 40 of wireless terminal 30A can comprise, in an example implementation, signal handler 68 and mobility management entity 70. The mobility management entity 70 comprises various functionalities and units, the best cell evaluator 44 and reporter 72 being illustrated as examples in FIG. 1A.

Figure 1B:
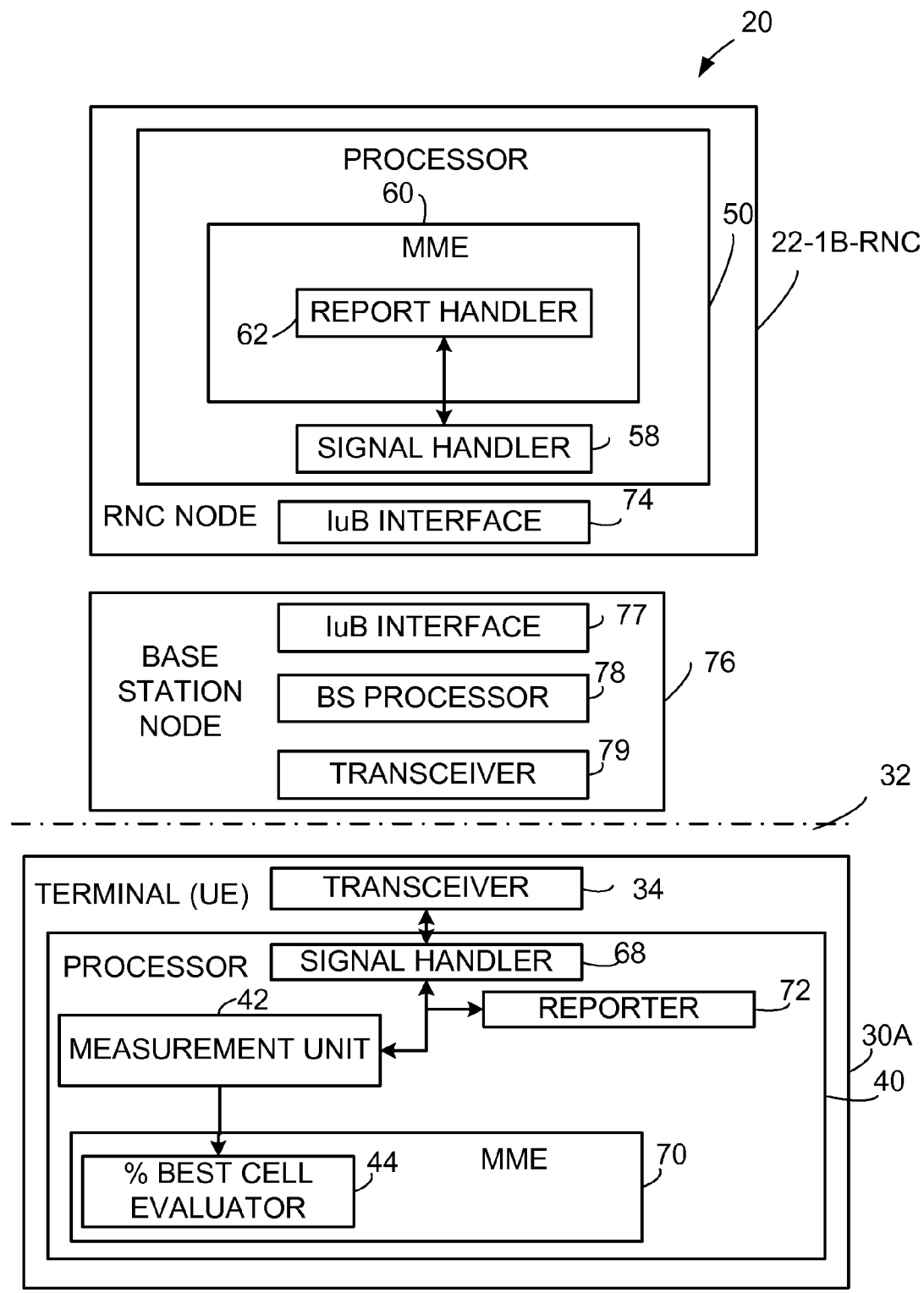

FIG. 1B illustrates in more detail example, non-limiting implementations of the network node and wireless terminal for the embodiment of FIG. 1 in a non-LTE UTRAN environment in which network node 22-1B-RNC is a radio network controller (RNC) node. As shown in FIG. 1B the RNC network node 22-1B-RNC comprises an IuB interface 74 which is connected to base station node 76. The base station node 76 in turn comprises base station IuB interface 77 for connecting base station node 76 to RNC network node 22-1B-RNC; base station processor 78; and base station transceiver(s) 79 over radio interface 32 with wireless terminal 30.

Figure 3A:
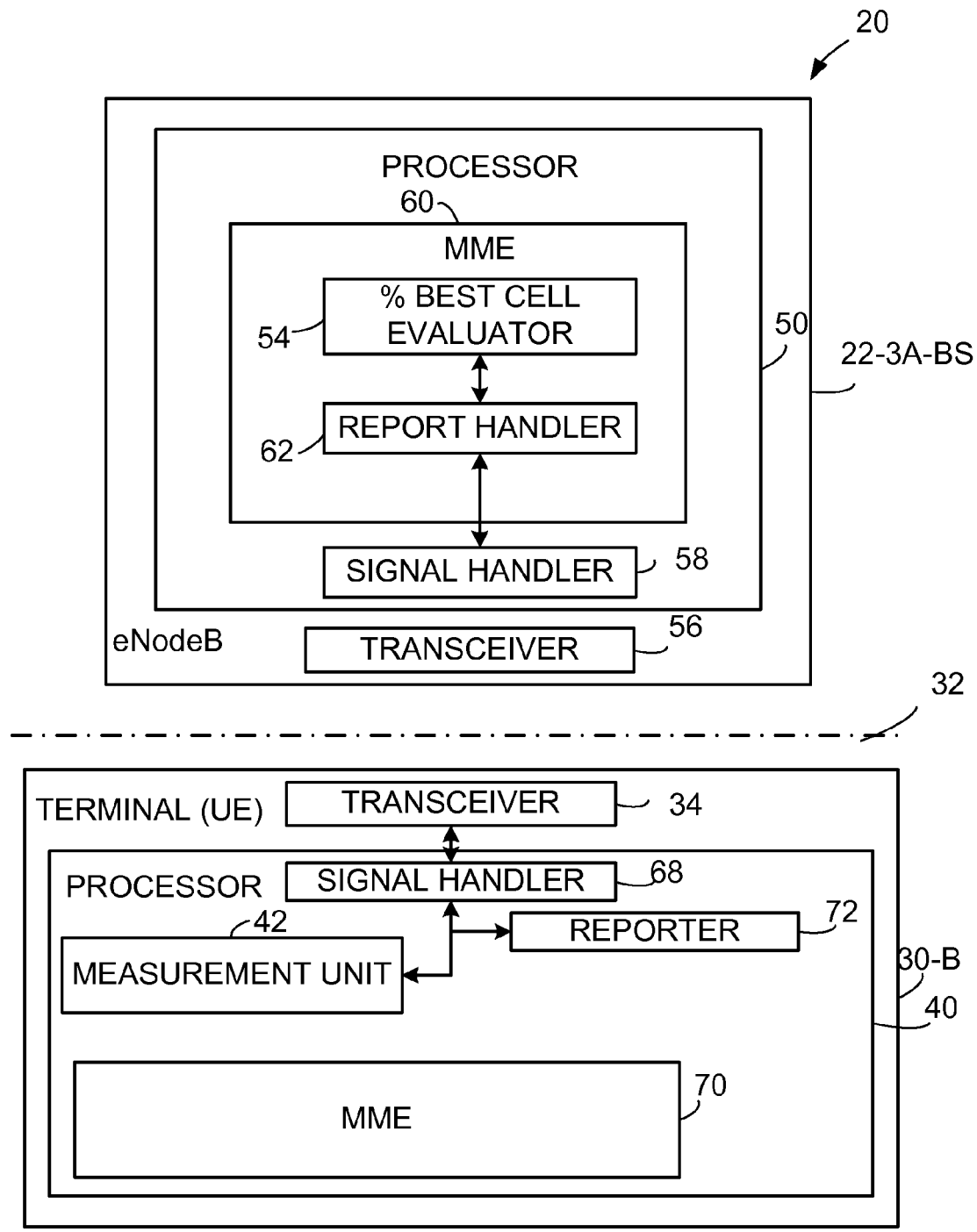

FIG. 3A illustrates in more detail example, non-limiting implementations of the network node and wireless terminal for the embodiment of FIG. 3 in a LTE environment in which network node 22-3A-BS is an eNodeB (e.g., base station node). As shown in FIG. 3A the network node 22-3A-BS comprises transceiver 56; processor 50 further comprises signal handler 58 and mobility management entity 60. The mobility management entity 60 comprises various functionalities and units, the best cell evaluator 54 and report handler 62 being illustrated in FIG. 3A. FIG. 3A similarly shows that processor 40 of wireless terminal 30B can comprise, in an example implementation, signal handler 68 and mobility management entity 70. The mobility management entity 70 comprises various functionalities and units, such as reporter 72 illustrated in FIG. 3A.

Figure 3B:
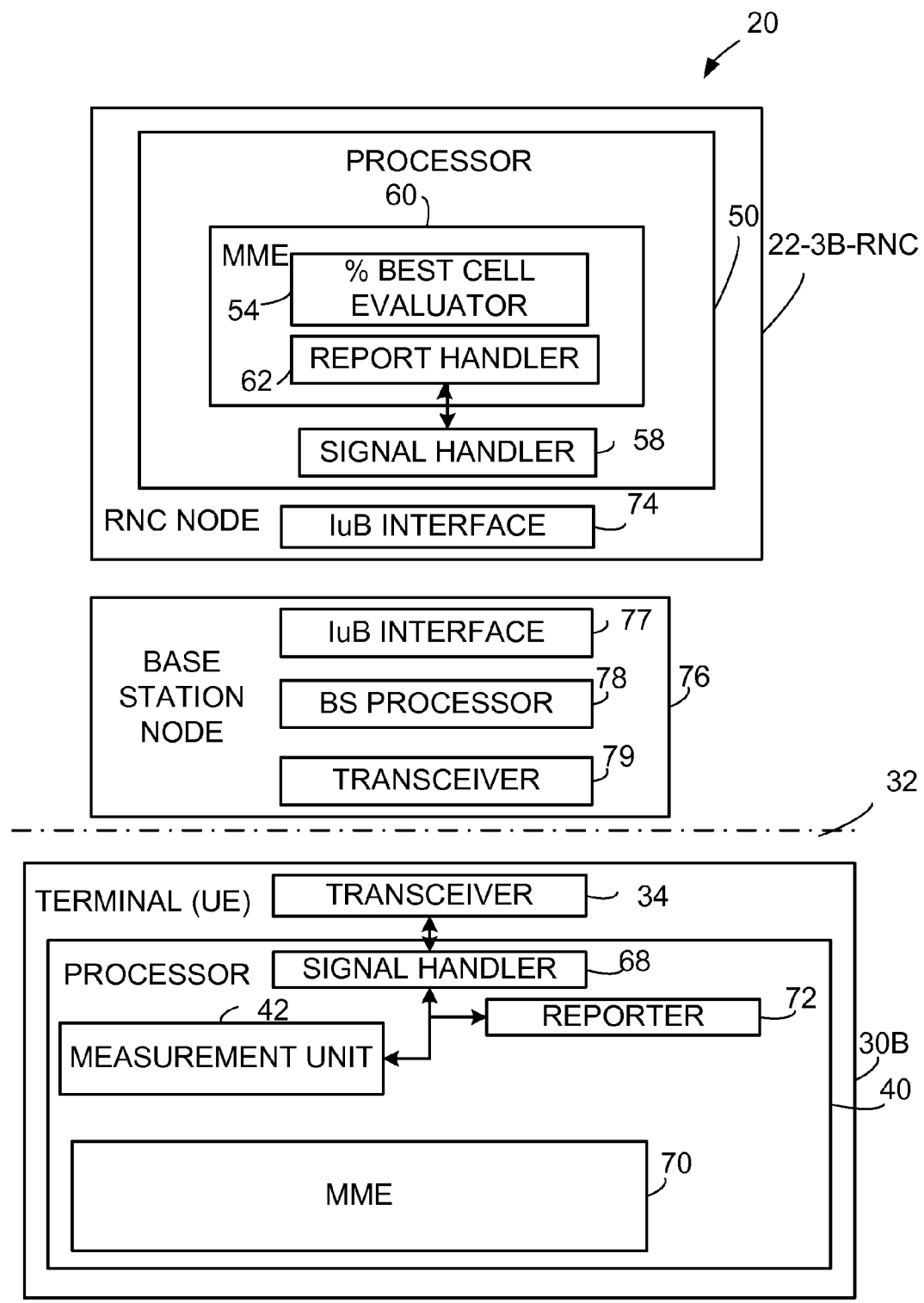

FIG. 3B illustrates in more detail example, non-limiting implementations of the network node and wireless terminal for the embodiment of FIG. 3 in a non-LTE UTRAN environment in which network node 22-3B-RNC is a radio network controller (RNC) node. As shown in FIG. 3B the RNC network node 22-3B-RNC comprises an IuB interface 74 which is connected to base station node 76. The base station node 76 in turn comprises base station IuB interface 77 for connecting base station node 76 to RNC network node 22-3B-RNC; base station processor 78; and base station transceiver(s) 79 which communicates over radio interface 32 with wireless terminal 30.

The fact that network node 22 can take the form of a eNodeB has thus been amply demonstrated by FIG. 1A and FIG. 3A. Similarly the fact that network node 22 can take the form of a radio network controller (RNC) node has been clearly illustrated by FIG. 1B and FIG. 3B. Various subsequently described and/or illustrated embodiments of network nodes can similarly take the form of an eNodeB or a radio network controller node. For sake of simplicity, however, only a generic network node 22 is hereinafter illustrated, it being now appreciated that the generic network node 22 can take many forms including the eNodeB and the radio network controller (RNC).

As discussed above, the performance criterion which is used for proactive measures is the percentage of the time the terminal is (or not) connected to the best cell. As used herein, determining the extent of connection to a best cell encompasses both determining the percentage of time that a terminal is connected to the best cell for the terminal, and determining the percentage of time that the terminal is not connected to the best cell for the terminal. Since one determination is simply the converse of the other, it will be understood that the phraseology "determining the percentage of time that a terminal is connected to the best cell for the terminal" or similar phrases is intended to cover both (1) determining the percentage of time that the terminal is connected to the best cell for the terminal and (2) determining the percentage of time that the terminal is not connected to the best cell for the terminal.

This performance measurement of act 4-2 (e.g., determining the percentage of time that the terminal is connected to the best cell for the terminal) is preceded by act 4-1, the taking of measurements relative to the serving and adjacent cells. The taking of measurements of act 4-1 can be performed at the terminal 30 in a wireless communication system by various ways. A first example measurement procedure (i) comprises making use of the measurements taken for serving and adjacent cells, e.g., measurements on the pilot channels of the serving and adjacent cells. A second example measurement procedure (ii) comprises measuring and estimating the downlink signal to interference ratio (SIR) received by the serving and adjacent cells.

In a typical implementation measurement procedure (i) is the most likely scenario, since the reference signal received power (RSRP)/referenced signal received quality (RSRQ) [or similar RSCP, Es/No in WCDMA] measurements are already done in the terminal. However, the technology disclosed herein is not limited to these functions it also covers other measurement procedures such as measurement procedure (ii).

Hence, the percentage of time the wireless terminal 30 is connected to the best cell can be deduced by these measurements which are done on the terminal side. For example, wireless terminal 30 uses the measurement unit 42 to make the measurements. Subsequently, the wireless terminal 30 can signal (via signal handler 68) this information to the network 20. The network 20, and particularly network node 22, can exploit this information as input to the mobility management algorithms, which have an impact on mobility management decisions.

Act 4-2 (e.g., determining the percentage of time that a terminal is connected to the best cell for the terminal) is also simply known herein as determining the "percentage time for the best cell". In order to determine the percentage time for the best cell, the wireless terminal 30 can perform a measuring procedure having acts such as that shown in FIG. 5.

Figure 5:
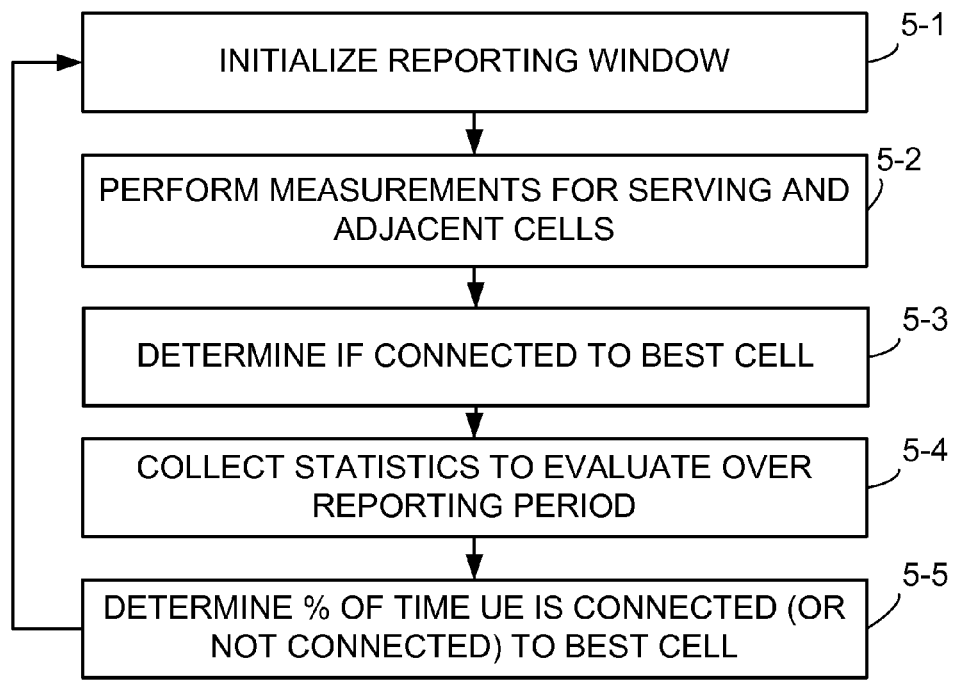
FIG. 5 is a flowchart showing basic, representative acts or steps of a measuring procedure performed by a wireless terminal.

The measuring procedure of FIG. 5 comprises a loop which begins with initializing a reporting window (act 5-1). Act 5-2 of FIG. 5 represents measurement unit 42 performing the measurements which are requisite to determining the percentage time for the best cell, and particularly taking or making a plurality of measurements for the serving cell and adjacent cells over the time span of the reporting window. Act 5-3 of the measuring procedure of FIG. 5 comprises determining, for each measurement time or sample, whether the wireless terminal 30 is connected to the best cell. Act 5-4 comprises collecting statistics to evaluate the best cell connection of wireless terminal 30 over the reporting period. Act 5-5 comprises determining the percentage time for the best cell. As explained subsequently, after the determination of act 5-5 the wireless terminal 30 can optionally itself adjust mobility related parameter(s) and/or send a report (via reporter 72) to network node 22.

Act 5-3 essentially comprises an act of determining whether the wireless terminal 30 is camped on (e.g., connected to) the best cell. Act 5-3 can be performed in various ways. A first way of determining whether the wireless terminal 30 is connected to the best cell is a non hysteresis based technique. A second way of determining whether the wireless terminal 30 is connected to the best cell is a hysteresis based technique.

According to the basic non-hysteresis technique the wireless terminal 30 compares the serving cell quality (or signal strength or both) with those of the best non-serving cell to collect statistics over certain evaluation time such as described, e.g. by Expression (1).

$$\text{If } RSM_S > \max_{i, i \neq s}(RSM1, RSM2, \ldots, RSM_i) \quad (1)$$

In Expression (1), RSM is a measure of the reference signal. The measure of the reference signal can be, for example, reference signal received power (RSRP), reference signal received quality (RSRQ), for example. In Expression (1) the term $RSM_S$ refers to the measure of the reference signal for the serving cell (e.g., the base station; $RSM_1$ refers to the measure of the reference signal for a first non-serving cell, and so forth). In Expression (1) all quantities are in dB scale (i.e. RSRP in dBm).

If Expression (1) is satisfied, the wireless terminal 30 is connected (or camped on) to the best cell. Otherwise (e.g., if Expression (1) is not satisfied) the wireless terminal 30 is not connected to (or not camped on) the best cell.

As indicated above, as act 5-4 the wireless terminal 30 collects statistics to evaluate the event over the time period, i.e., the percentage of time the wireless terminal 30 is connected to (or not connected to) the best cell. Such statistics can either be used as a basis for the wireless terminal 30 to determine the percentage time for the best cell (if the wireless terminal 30 comprises a best cell evaluator 44 as in the embodiment of FIG. 1A and FIG. 1B) and/or be reported by reporter 72 to network node 22.

The measurements (e.g., RSCP, Ec/No, RSRP and RSRQ) made by the wireless terminal 30 are vulnerable to inaccuracies. The actual values of these parameters depend upon side conditions and accordingly are susceptible to poor accuracy when Io (total interference) is higher, etc. For example, it may occur that the wireless terminal 30 is camped onto the best cell less than a target threshold, e.g., camped on the best cell for 80% of the time, but the target requirement was that the wireless terminal 30 be camped on the best cell for 90% of the time, and yet the best cell is not significantly stronger than the serving cell. Such can be the case, for example, if the best cell is just 1-2 dB stronger than the serving cell. In this situation it is better to use a hysteresis technique which adapts to a new set of mobility parameters provided that the best cell is a predetermined measure (e.g., x dB) stronger than the serving cell for a predetermined percentage (e.g., Y percentage) of the time. This technique thus provides some hysteresis in adapting to the mobility parameters. According to this technique the values X and Y can be configured by the network, can be standardized values, or can be implementation specific for the particular wireless terminal 30.

Thus the hysteresis technique is based on relative thresholds/hysteresis and, for an example embodiment, can be expressed by Expression (2).

$$\text{If } \{\max_{i, i \neq s}(RSM1, RSM2, \ldots, RSM_i) - RSM_S\} > \gamma \quad (2)$$

In Expression (2) RSM is again a measure of the reference signal (in similar manner as Expression (1)). If Expression (2) is satisfied, then the wireless terminal 30 is considered not connected (or camped on) to the best cell. Otherwise the wireless terminal 30 is considered connected (or camped on) to the best cell.

Expression (3) can be used instead of using Expression (2) as the criteria for the hysteresis technique.

$$\text{If } \{RSM_S - \max_{i, i \neq s}(RSM1, RSM2, \ldots, RSM_i)\} > \beta \quad (3)$$

When Expression (3) is satisfied, then the wireless terminal 30 is considered connected (or camped on) to the best cell. Otherwise the wireless terminal 30 is considered not connected (or camped on) to the best cell.

The thresholds values (such as $\gamma$ of Expression (2) and Expression (3)) can be configured by the network or standardized values.

As understood from the foregoing, based on plural measurements taken as act 5-3 (using any of the expressions provide above) over the time window, as act 5-4 the wireless terminal 30 collects statistics. The wireless terminal 30 can either itself evaluate the event over the time period, i.e., make the determination of the percentage of time the wireless terminal 30 is connected to (or not connected to) the best cell, or can merely report the statistics via reporter 72 to network node 22.

The triggers or factors which have an impact on phenomena such as handover and cell reselection are herein also called "mobility related parameters". Some of the mobility related parameters are direct inputs to a mobility management procedure for determining handover and cell reselection, and accordingly are called mobility management parameters. Two examples of mobility management parameters include hysteresis in received signal value (SH) (e.g., received signal strength or received signal quality) and the time hysteresis (TH) before making the handover decision. Additional mobility management parameters can include the L3 filter coefficient for averaging measurement, the measurement period, the time window used for averaging measurements. An aspect of the technology disclosed herein is updating or adjusting one or more of the mobility related parameters based on the percentage of time the terminal is (or is not) connected in the best cell.

Thus, as a further feature an example mode of the method also comprises using the wireless terminal or the network node to select a mobility related parameter for the wireless terminal in accordance with the determination of the percentage of time that the terminal is connected to the best cell for the terminal. For example, the mobility related parameter can be a mobility management parameter. Accordingly, yet a further example mode of the method comprises using the mobility management parameter to define when a handover decision is made.

Figure 6:
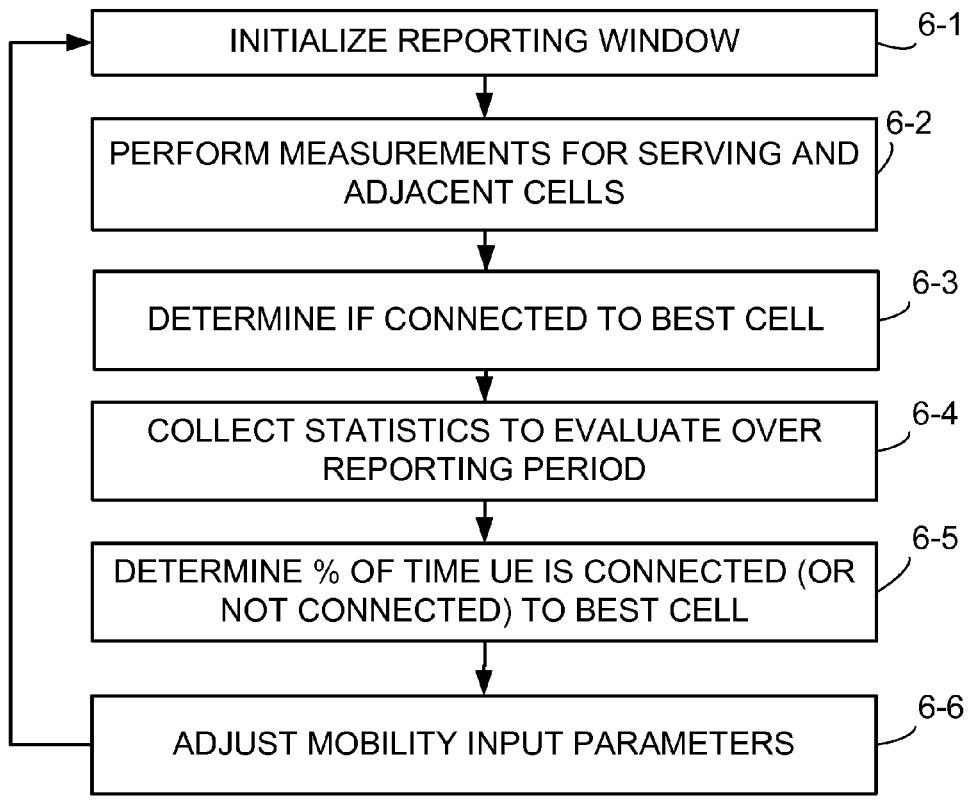
FIG. 6 is a flowchart showing basic, representative acts or steps of a combined measuring and mobility related parameter adjusting procedure.

FIG. 6 illustrates example acts or steps comprising a method of selecting/adjusting/updating a mobility related parameter for the wireless terminal in accordance with the determination of the percentage time for the best cell. Act 6-1 through act 6-5 of the method of FIG. 6 are analogous if not identical to act 5-1 through at 5-5, respectively, of the method of FIG. 5. The method of FIG. 6 differs from the method of FIG. 5 by inclusion of further act 6-6, e.g., the act of adjusting the mobility related parameter based on the determination of percentage of time that the terminal is connected to the best cell for the terminal. Act 6-6 can comprise adjusting not just one, but in some cases plural mobility related parameters.

As mentioned previously, act 6-6 (adjusting the mobility related parameter based on the determination of percentage of time that the terminal is connected to the best cell for the terminal) can be performed either by wireless terminal 30 using its best cell evaluator 44 (see FIG. 1A and FIG. 1B), or by network node 22 using its best cell evaluator 54 (see FIG. 3A and FIG. 3B).

Figure 6A:
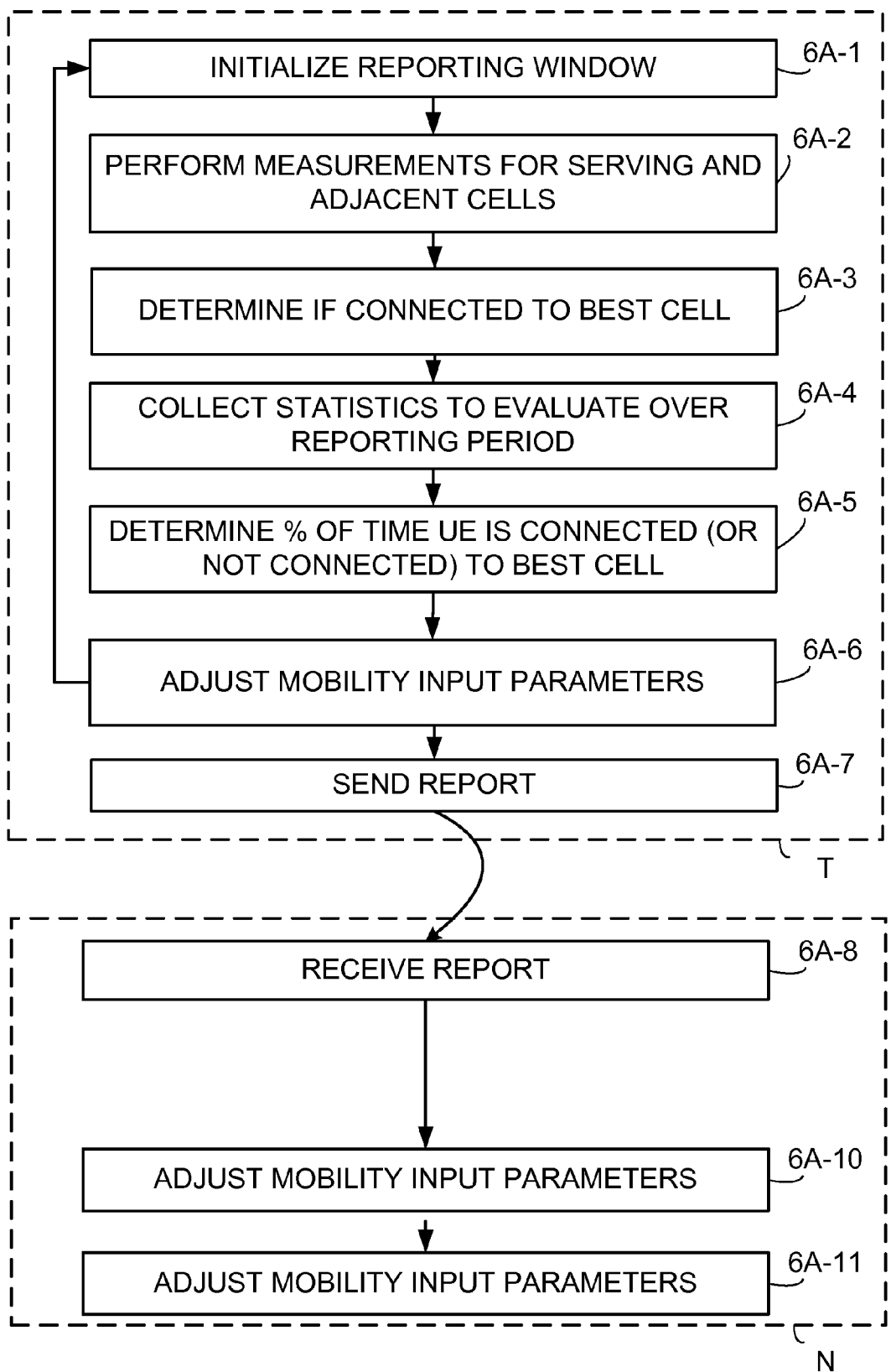
FIG. 6A is a flowchart showing basic, representative acts or steps of a combined measuring and mobility related parameter adjusting procedure wherein the mobility related parameter adjusting is performed by a wireless terminal.
Figure 7A:
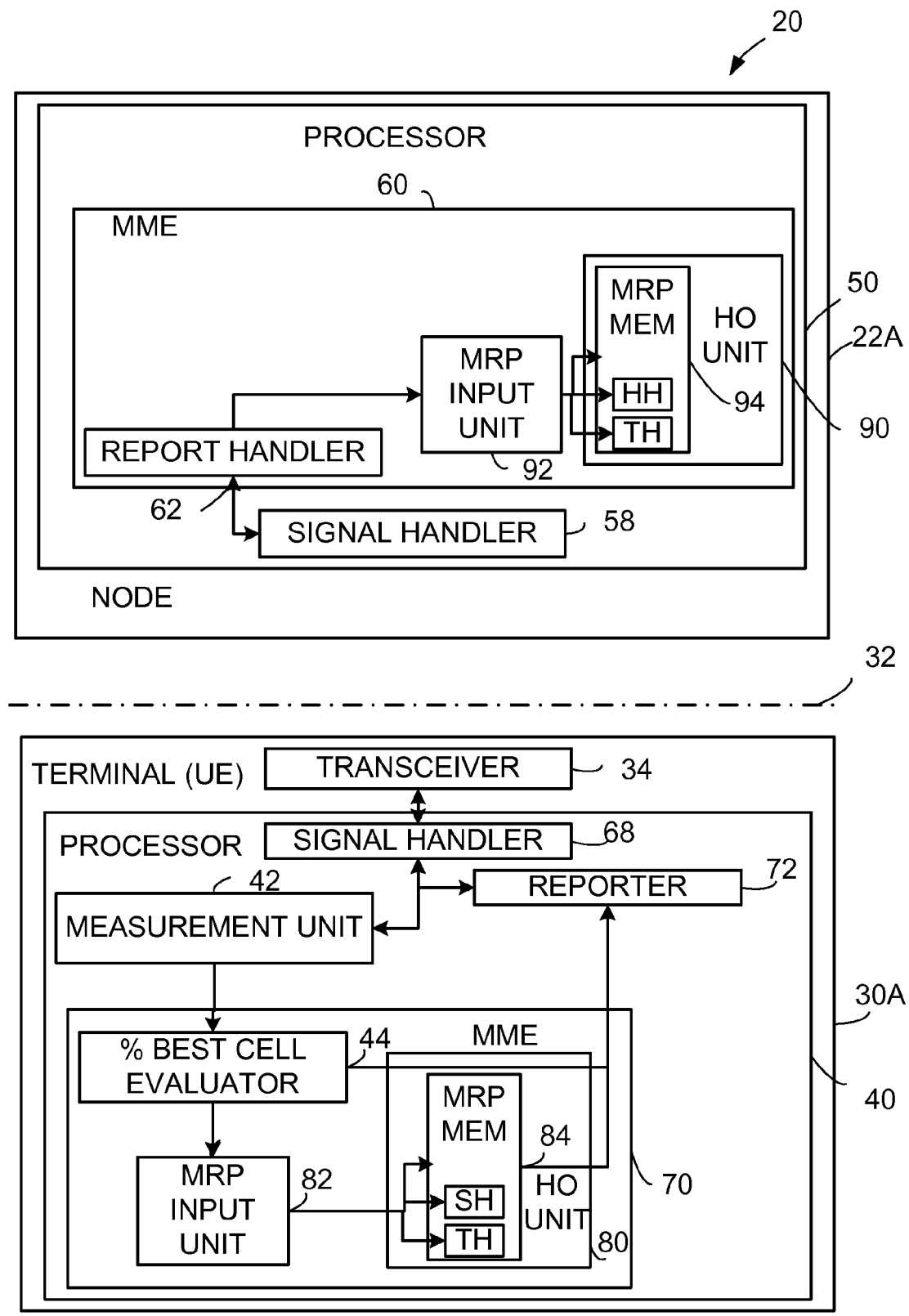
FIG. 7A is a schematic view of an example embodiment of a communications network wherein a wireless terminal is configured to perform a mobility related parameter adjusting procedure.

FIG. 6A and FIG. 7A illustrate in more detail an example embodiment and mode wherein wireless terminal 30 adjusts the mobility related parameter based on the determination of percentage of time that the terminal is connected to the best cell for the terminal. In FIG. 6A and other comparable figures, the acts performed by wireless terminal 30 are framed by broken line T; the acts performed by network node 22 are framed by broken line N.

FIG. 7A shows in more detail various aspects of wireless terminal 30A which are more specifically directed to the mobility related parameter adjusting procedure performed by wireless terminal 30A, and particularly shows various additional functional units or elements of mobility management entity (MME) 70. In addition to best cell evaluator 44 the mobility management entity 70 comprises handover unit 80 and mobility related parameter (MRP) input unit 82 (also known as MRP update unit). The handover unit 80 comprises a mobility related parameter (MRP) memory 84 wherein are stored operative (e.g., currently utilized values) for mobility management procedures (including handover). Among the mobility related parameters illustrated in FIG. 7A as being stored in MRP memory 84 are hysteresis in received signal value (SH) and the time hysteresis (TH) before making the handover decision. FIG. 7A also shows that (in like manner as mobility management entity 70 of wireless terminal 30A) mobility management entity 60 of network node 22A comprises handover unit 90 and MRP input unit 92 (also known as MRP update unit). Handover unit 90 in turn comprises mobility related parameter (MRP) memory 94. Among the mobility related parameters illustrated in FIG. 7A as being stored in MRP memory 94 are hysteresis in received signal value (SH) and the time hysteresis (TH) before making the handover decision.

FIG. 6A shows example representative acts or steps performed by wireless terminal 30A and network node 22A of FIG. 7A in conjunction with the mobility related parameter adjusting procedure performed by wireless terminal 30A. Act 6A-1 through act 6A-6 of the method of FIG. 7 are analogous if not identical to act 6-1 through at 6-6, respectively, of the method of FIG. 6. The act 6A-6 of determining the percentage of time that a terminal is connected to the best cell for the terminal is performed by best cell evaluator 44 of wireless terminal 30A. Included in act 6A-6 is best cell evaluator 44 providing the results of its determination (e.g., the percentage of time that a terminal is connected to the best cell for the terminal) to MRP update unit 82. If the results of the determination so require, the MRP memory 84 changes the value of one or more mobility related parameters in MRP memory 84, so that the updated/changed/altered values of the mobility related parameter(s) will be available for use by mobility management entity 70 in conjunction with any further handover procedures.

Insofar as the wireless terminal 30A is concerned, the method of FIG. 6A differs from the method of FIG. 6 by inclusion of further act 6A-7, e.g., the act of providing a report (e.g., sending a report) to network node 22A. The report that is sent from wireless terminal 30A as part of act 6A-7 can include the mobility related parameter(s) which are determined by MRP update unit 82 as a result of the determination of percentage of time that the terminal is connected to the best cell for the terminal (as determined by best cell evaluator 44). Optionally and/or additionally the reporter 72 can also provide the determination made by the best cell evaluator 44, as well as some or all of the measurements made by measurement unit 42.

FIG. 6A further shows that as act 6A-8 network node 22A receives the report from wireless terminal 30a. In particular the report handler 62 receives and interprets the report and applies the mobility related parameter(s) included in the report to MRP update unit 92 (also known as the MRP input unit). The MRP update unit 92 in turn updates the value of the mobility related parameter(s) in MRP memory 94 of handover unit 90, so that the updated mobility related parameter(s) will be available to handover unit 90 for use in a next handover operation involving wireless terminal 30a.

Figure 6B:
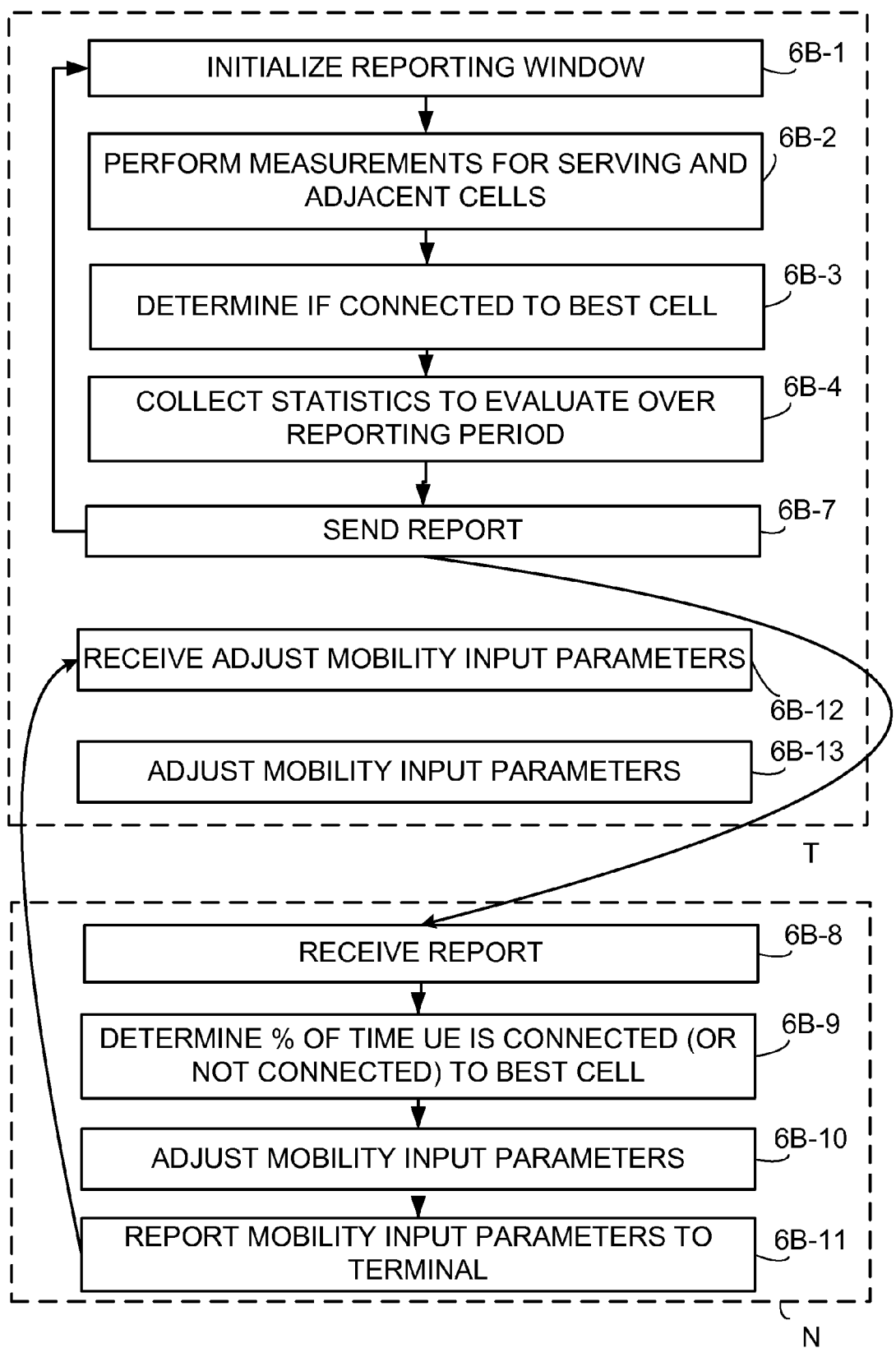
FIG. 6B is a flowchart showing basic, representative acts or steps of a combined measuring and mobility related parameter adjusting procedure wherein the mobility related parameter adjusting is performed by a network node.
Figure 7B:
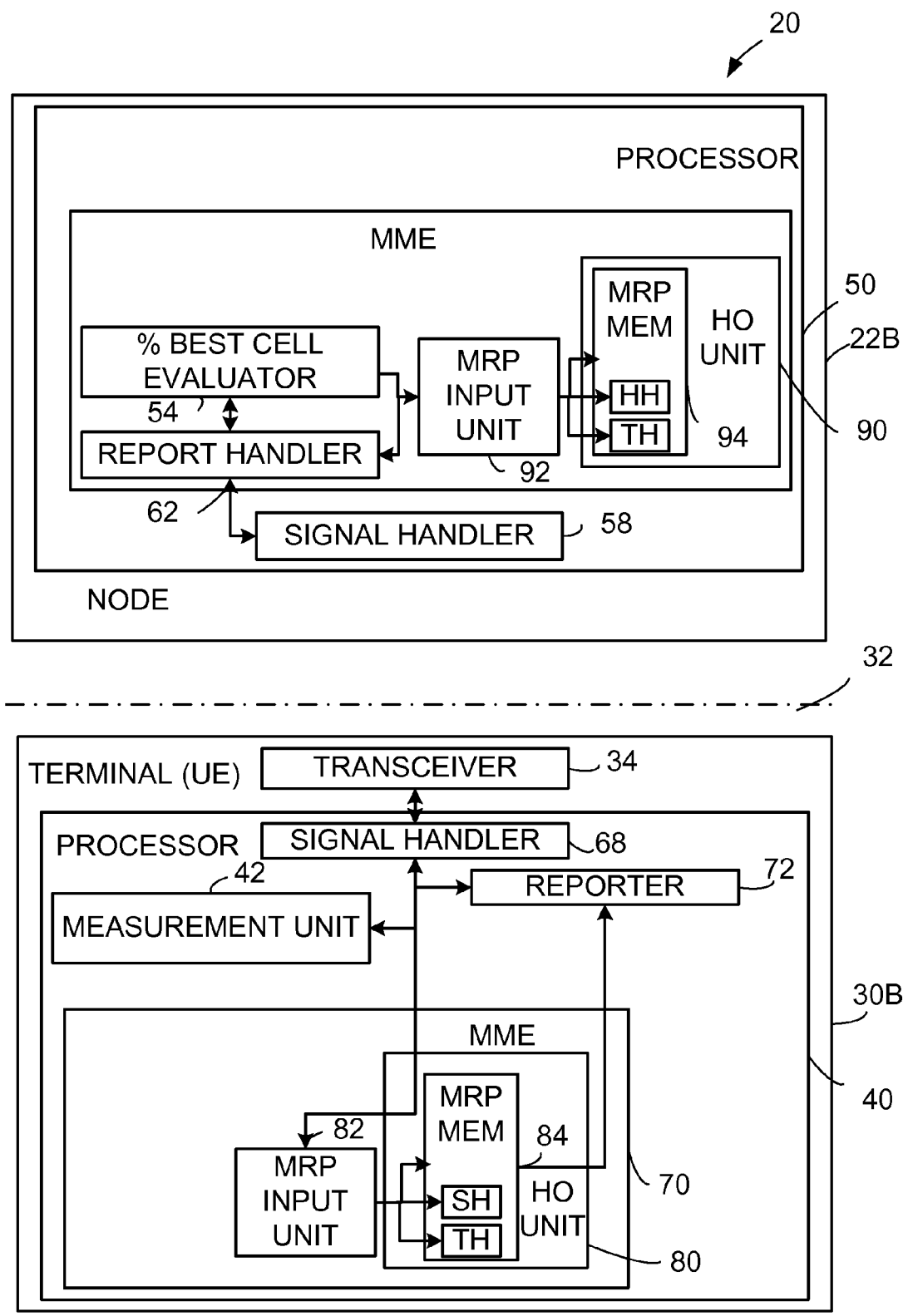
FIG. 7B is a schematic view of an example embodiment of a communications network wherein a wireless terminal is configured to perform a mobility related parameter adjusting procedure.

FIG. 7B shows various aspects of network node 22b which are more specifically directed to the mobility related parameter adjusting procedure performed by network node 22B. FIG. 6B shows, e.g., acts performed by network node 22B in conjunction with the mobility related parameter adjusting procedure. In particular, FIG. 6B shows as act 6B-8 that the report handler 62 of network node 22B receives the statistics collected from measurement unit 42 of wireless terminal 30B. The statistics are applied to best cell evaluator 54 which performs act 6B-9 of determining the percentage of time that the terminal is connected to the best cell for the terminal. As act 6B-10 the MRP update unit 92 uses the determination of act 6B-9 in turn to adjust update the value of the mobility related parameter(s) in MRP memory 94 of handover unit 90. As the updated mobility related parameter(s) will be available to handover unit 90 for use in a next handover operation involving wireless terminal 30B. Further, as act 6B-11 the report handler 62 of network node 22B sends or reports the updated mobility related parameter(s) to the wireless terminal 30B. As act 6B-12 the network node 22B receives the updated mobility related parameter(s). As act 6B-13 the updated mobility related parameter(s) received from network node 22B are then applied by MRP update unit 82 to the MRP memory 84 so that the updated mobility related parameter(s) will be available in conjunction with the next handover operation.

Figure 8:
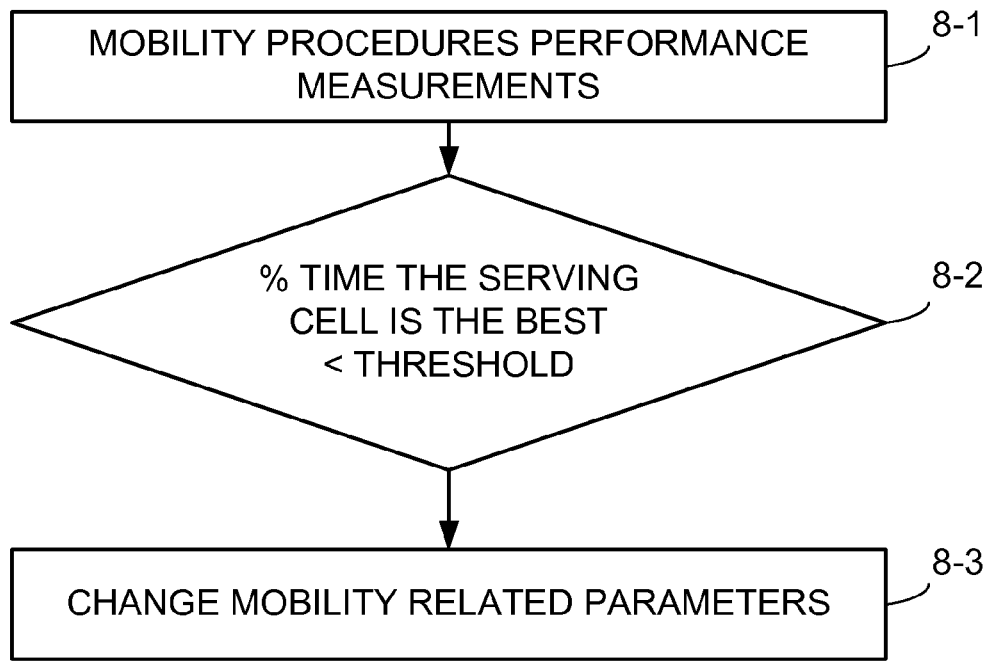
FIG. 8 is a flowchart showing basic, representative acts or steps of a generic mobility related parameter adjusting procedure.

Thus various preceding embodiments describe that one of the aspects of the technology disclosed herein is making a determination of the percentage of time that a terminal is connected to the best cell for the terminal, and adjusting the mobility related parameter(s) in accordance with the determination. The basic generic actions are reflected by FIG. 8. Act 8-1 of FIG. 8 comprises making the mobility procedure performance measurements (as can be done by measurement unit 42). Act 8-2 comprises making the determination of the percentage of time that a terminal is connected to the best cell for the terminal (as can be done by either best cell evaluator 44 of wireless terminal 30 or best cell evaluator 54 of network node 22). Act 8-3 comprises adjusting the mobility related parameter(s) (as can be done by either MRP update unit 82 of wireless terminal 30 or MRP update unit 92 of network node 22).

Table 1 shows that the percentage of time the wireless terminal 30 is not connected to the best cell for two different settings of cell reselection triggers. The data of Table 1 concerns a scenario in which the speed of the wireless terminal 30 is 3 km/h and the cell radius is 288 meters. From Table 1 it can be readily seen that choosing the appropriate discontinuous reception (DRX) cycle is of high impact on the handover performance, e.g., the different DRX cycles in Table 1 can lead to a difference of 14% in the percentage of time the wireless terminal 30 is not connected to the best cell.

TABLE 1

| | Cell Reselection Triggers {Qhyst [dB], Treselection (sec)} | % of time not connected to the best cell |
|---|---|---|
| Setting 1 | {0, 1.2} | 5.69 |
| Setting 2 | {4, 0.2} | 12.14 |

Another input parameter (variable) having an impact on mobility management procedures is the activity cycle (i.e. discontinuous reception (DRX) cycle). The discontinuous reception (DRX) is used in order to save power in the terminal, i.e. the terminal only needs to be active a fraction of time for receiving information. DRX is typically used in case small amount of data is transmitted to the terminal (VoIP, "Pings" etc). Furthermore the activity cycle length typically also defines the periodicity with which the measurement of the signal strength received on the pilots from serving and neighbouring cells are done. Hence, the activity cycle defines the filter length of measurements, which in turn affects the response time for the terminal to react on radio scenario changes.

Figure 9:
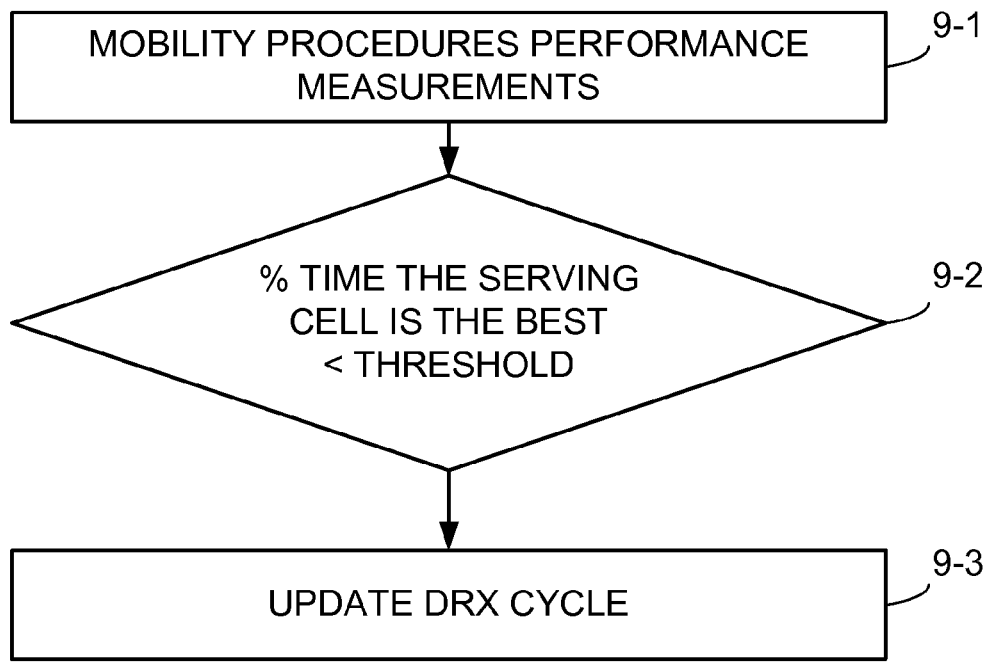
FIG. 9 is a flowchart showing basic, representative acts or steps of a discontinuous reception (DRX) parameter adjusting procedure.

As yet another of its aspects, some embodiments of the technology disclosed herein concern adjusting, as a result of the percentage time for the best cell, a mobility related parameter in the form of a parameter of a discontinuous reception (DRX) cycle, e.g., length of a discontinuous reception (DRX) cycle. The basic generic actions of the DRX mode are reflected by FIG. 9. Act 9-1 of FIG. 9 comprises making the mobility procedure performance measurements (as can be done by measurement unit 42). Act 9-2 comprises making the determination of the percentage of time that the terminal is connected to the best cell for the terminal (as can be done by either best cell evaluator 44 of wireless terminal 30 or best cell evaluator 54 of network node 22). Act 9-3 comprises adjusting the discontinuous reception (DRX) parameter, e.g., length of the DRX cycle.

Figure 10A:
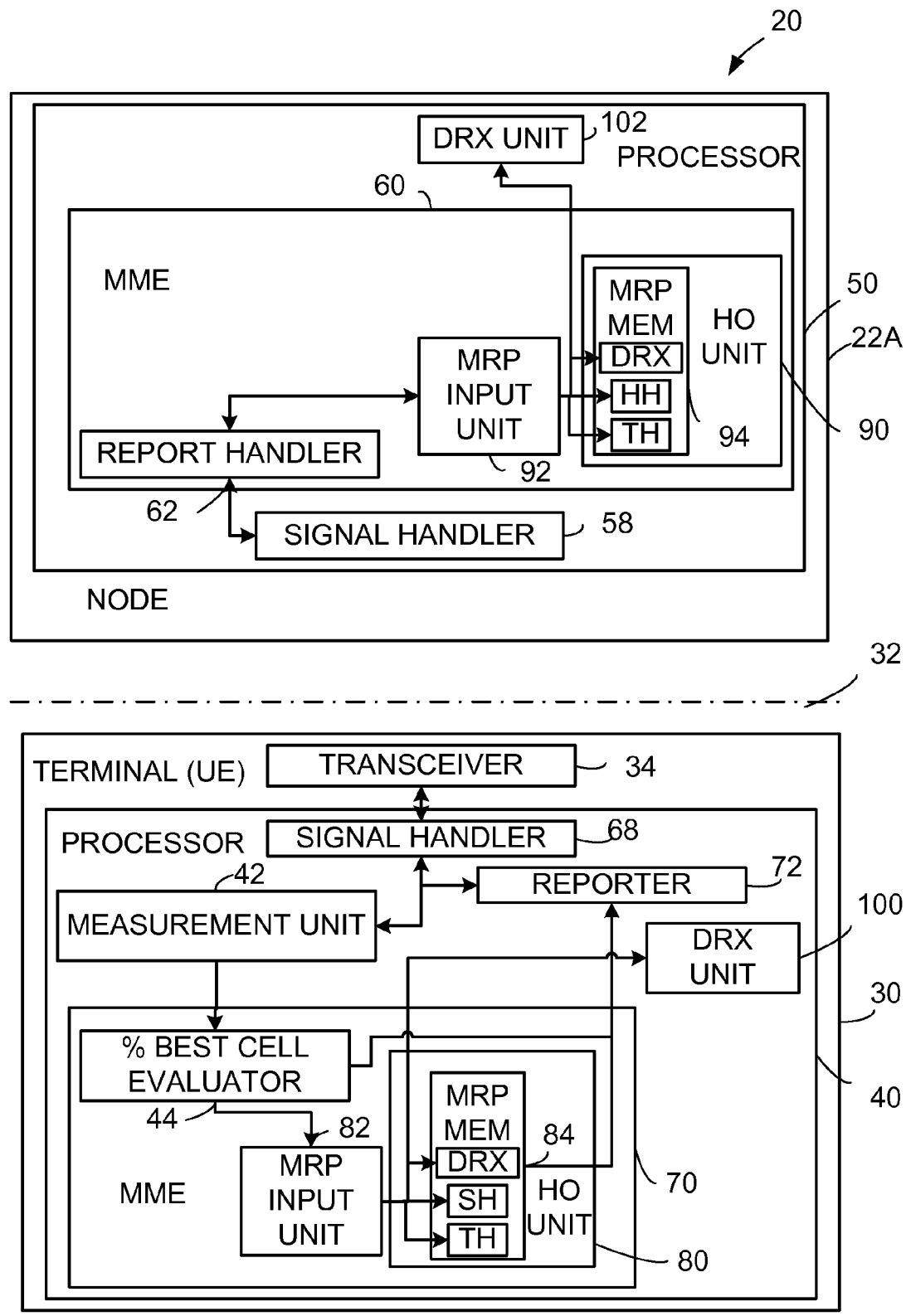
FIG. 10A is a schematic view of an example embodiment wherein a wireless terminal has the ability to update a discontinuous reception (DRX) parameter in accordance with a determination of the percentage of time that a terminal is connected to the best cell for the terminal.

Adjusting the DRX parameter can be performed either by wireless terminal or by the network node. FIG. 10A shows an embodiment of a wireless terminal having a DRX unit 100 and wherein MRP update unit 82 has the ability to update the DRX parameter for the DRX unit 100. When the MRP update unit 82 does update the DRX parameter for DRX unit 100, any updated parameters including the updated DRX parameter are also supplied to MRP memory 84 of handover unit 80 as well as to reporter 72. The reporter 72 notifies network node 22 of the updated DRX parameter. The report of the DRX parameter as received by network node 22 is processed by report handler 62, and the updated parameters including the updated DRX parameter are applied to MRP update unit 92. The MRP update unit 92 in turn provides the updated parameters including the updated DRX parameter to MRP memory 94 of handover unit 90. In addition, the updated DRX parameter is provided to DRX unit 102 of network node 22. The discontinuous reception (DRX) parameter is then used by network node 22 in conjunction with the discontinuous reception (DRX) procedure.

Figure 10B:
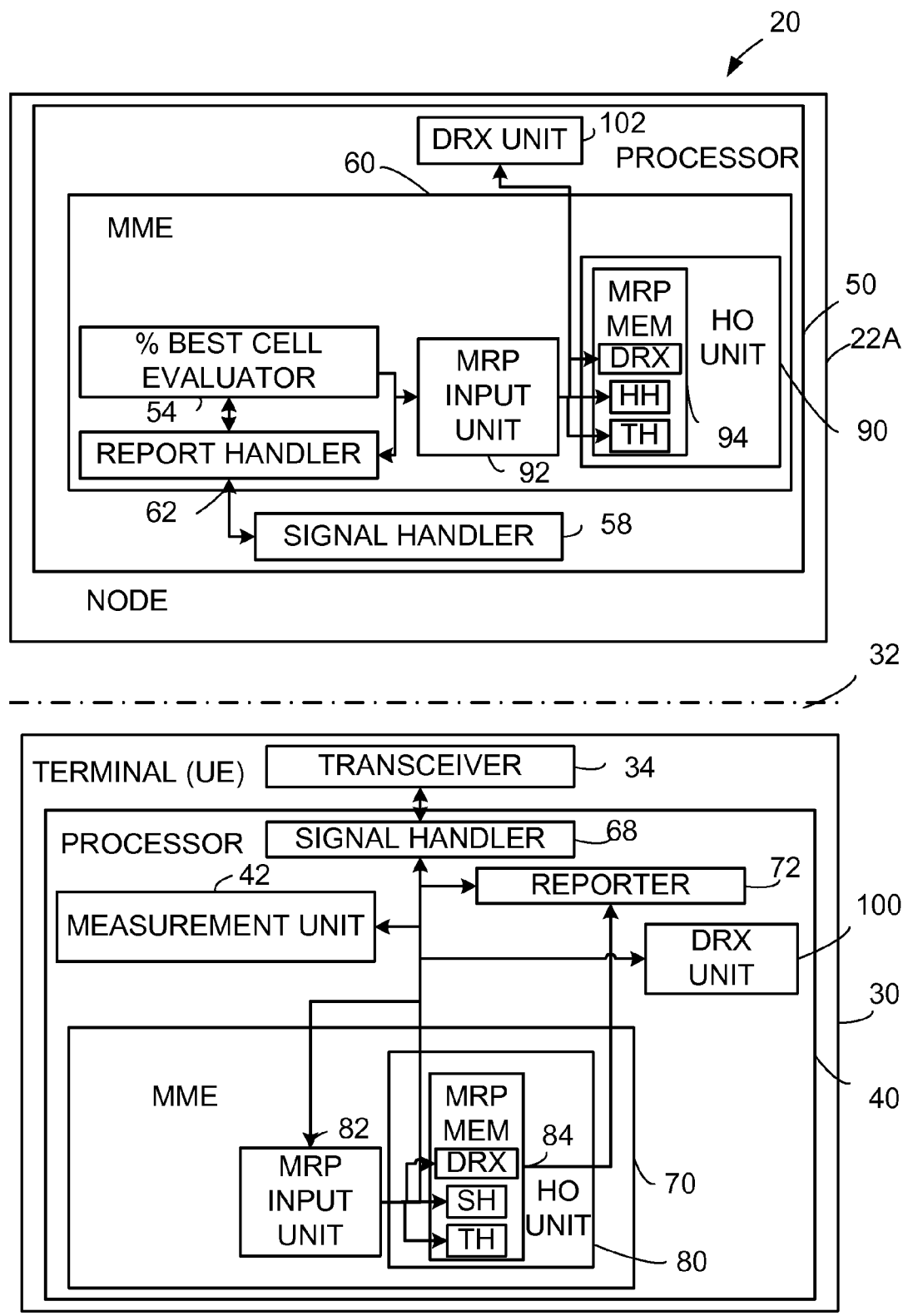
FIG. 10B is a schematic view of an example embodiment wherein a network node has the ability to update a discontinuous reception (DRX) parameter in accordance with a determination of the percentage of time that a terminal is connected to the best cell for the terminal.

FIG. 10B shows an embodiment of a network node 22 wherein the MRP update unit 92 has the capability of updating a discontinuous reception (DRX) parameter based on the determination made by node-resident best cell evaluator 54. If the determination of the percentage of time that the terminal is connected to the best cell for the terminal (made by best cell evaluator 54) so warrants, the MRP update unit 92 is able to update one or more mobility related parameter(s) including the discontinuous reception (DRX) parameter. The updated mobility related parameter(s) are loaded into MRP memory 94 for use by handover unit 90, the updated discontinuous reception (DRX) parameter is also applied to DRX unit 102. The discontinuous reception (DRX) parameter is then used by network node 22 in conjunction with the discontinuous reception (DRX) procedure. The discontinuous reception (DRX) parameter as updated by MRP update unit 92 is also provided to report handler 62, which prepares a report for transmission to wireless terminal 30. Such a report is received by wireless terminal 30 and distributed by its reporter 72 to DRX unit 100 of wireless terminal 30, so that DRX unit 100 is aware of the discontinuous reception (DRX) parameter value being used by network node 22 for the discontinuous reception (DRX) procedure.

Figure 11:
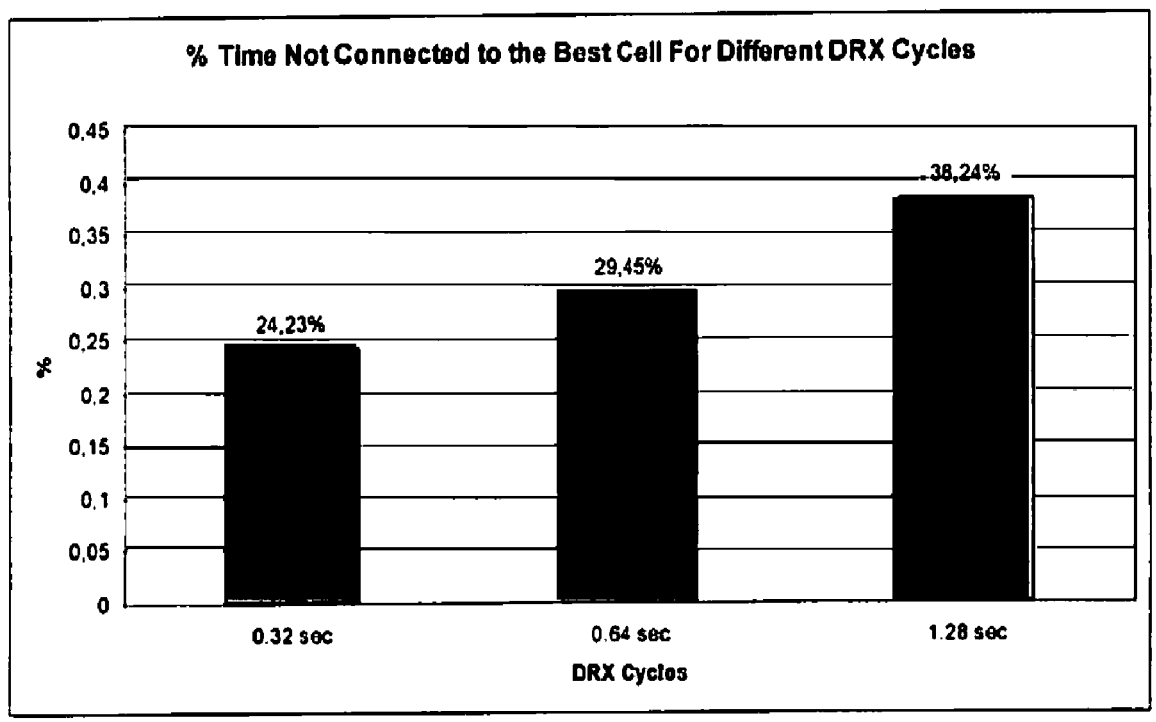
FIG. 11 is a bar graph showing shows a percentage of time a terminal is not connected to the best cell for three different discontinuous reception (DRX) cycles.

FIG. 11 is a bar graph showing the percentage of time a terminal is not connected to the best cell for three different discontinuous reception (DRX) cycles, when the terminal's speed is 200 km/h, the cell radius is 288 m and the hysteresis in received signal value (HO hysteresis) and Time To Trigger (time hysteresis (TH) before making the handover decision) are set to 4 dBs and 0 seconds, respectively.

Upon change of mobility management parameters or change of discontinuous reception (DRX) cycle as a result of this mechanism (e.g., the determination of percentage time for the best cell), then the performance counters are set to null and a new period for measuring this percentage of time the terminal is not connected to the best cell starts.

In addition, since the consequences of this adaptation might not be immediately visible in mobility management mechanisms performance, it is suggested to specify a minimum time between consecutive changes of mobility related parameter(s) such as mobility management parameters and discontinuous reception (DRX) cycles.

Some example embodiments and implementations occur in the context of the 3GPP Long Term Evolution (LTE) system. Hence, the terminology and signalling from 3GPP LTE is adopted in various portions of this description. However, it should be understood that the technology disclosed herein is not confined or limited to any LTE embodiment or implementation.

As explained above, the wireless terminal 30 (which can be a User Equipment (UE)) performs periodically measurements of a reference signal, e.g., of the reference signal received power (RSRP) (or Quality-RSRQ). The measurements made by the wireless terminal regarding the serving cell as well as measurements from N other (e.g., adjacent) cells by the UE detected adjacent cells are estimated and available at the wireless terminal at periodically spaced time instants. Hence, within a given time window of time, W, the wireless terminal can measure the amount of times the reference signal value from the serving cell is not the highest (or, equivalently, the percentage of time during which the reference signal value from the serving cell is not the highest can be estimated).

Similarly, instead of making measurements regarding reference signal value, the wireless terminal could also make measurements of the downlink (DL) signal to interference ratio (SIR) of the connection to the serving cell during DL transmission occurrences. The wireless terminal can then also evaluate the DL SIR received by detected adjacent-non serving cells. By knowing the cell-specific sequence transmitted over the reference signal (which is known since the wireless terminal has detected the cell identity and hence the received signal signature), the wireless terminal can deduce the received signal value (e.g., received signal strength) from an adjacent-non serving-cell. In addition, the wireless terminal measures the total received power from all the cells, both by the serving and adjacent-non serving ones. Hence, from this information, the wireless terminal can also deduce the other cell interference the wireless terminal would experience, in case the wireless terminal were connected in the designated adjacent cell. The comparison of the DL SIR values from the serving cell and adjacent cells can give the percentage of time the wireless terminal is not connected to the best cell.

In the connected mode this information (percentage of time the wireless terminal is not connected to the best cell) can then be signalled to the network node by making use of RRC signalling. An event can be defined, such as a point in time when this percentage of time the wireless terminal is not connected to the best cell exceeds a threshold. The threshold as well as the minimum time duration over which the wireless terminal should evaluate this event can be configured or signalled by the network or can be standardized values or wireless terminal implementation specific. Upon detection of this event, an RRC message can be transmitted to the network node. This RRC message can be included in the existing measurement report with a separate event identity.

Alternatively, this information can be transmitted periodically to the network node and the required parameters for estimating the percentage of time that that the wireless terminal is not camped to the best cell are configured by the network.

Figure 12:
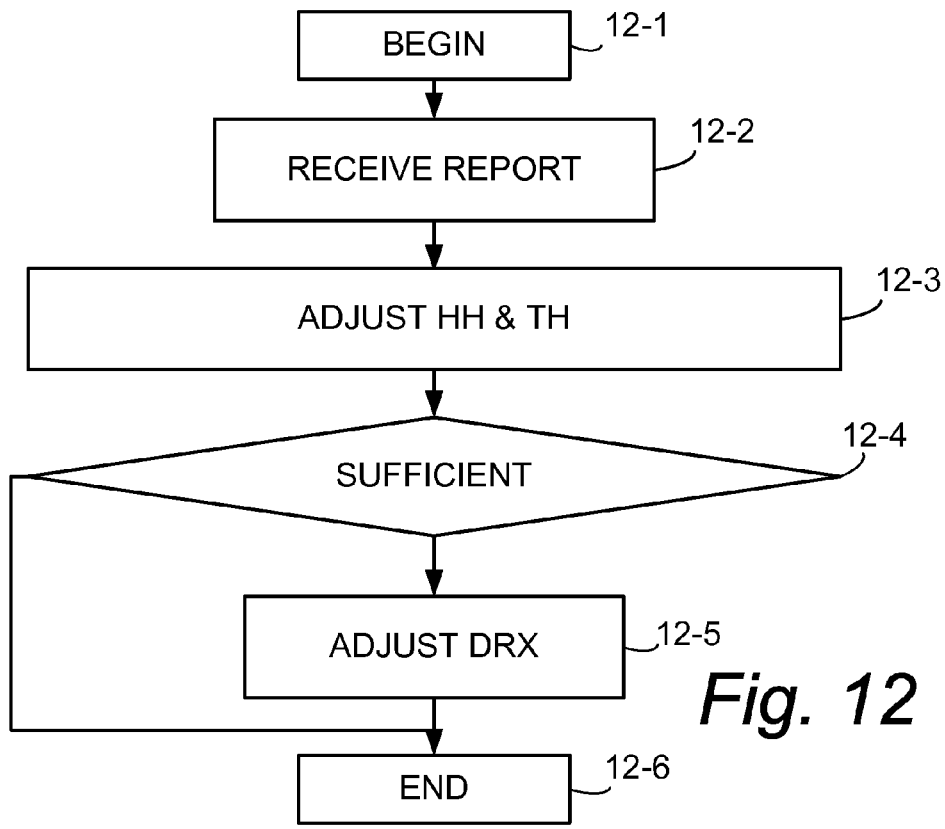
FIG. 12 is a flowchart showing basic acts or steps involved in an example embodiment of an adjustment procedure wherein a first set of mobility related parameters is adjusted or modified and a second set of mobility related parameter(s) are subsequently adjusted if the first adjustment is not sufficient.

In an example embodiment whose operation is depicted by FIG. 12, the network can make use of this information (e.g., the percentage of time that a terminal is connected to the best cell for the terminal) so as to make the adaptation of (1) handover hysteresis and (2) time hysteresis (TH) before making the handover decision (e.g., time to transmission [TTT]) in case of handover, or if this is not sufficient, (3) to adapt the DRX cycle as well. FIG. 12 shows a mobility related parameter adjustment procedure which begins with act 12-1. Act 12-2 comprises receiving a report (e.g., of the percentage of time that a terminal is connected to the best cell for the terminal). Act 12-3 comprises adjusting a first set of mobility related parameters on the basis of the report. As one example mode shown in FIG. 12, the mobility related parameters adjusted as act 12-3 can comprise the hysteresis in received signal value (SH) and time hysteresis (TH) before making the handover decision. If at act 12-4 the adjustments of act 12-3 are not deemed sufficient, as act 12-5 a second set of mobility related parameter(s) is adjusted before the adjustment procedure of FIG. 12 ends at act 12-6. The second set of mobility related parameter(s) can include the discontinuous reception (DRX) parameter. The adjustment procedure of FIG. 12 simply ends if the adjustments of act 12-3 are deemed sufficient.

Figure 13:
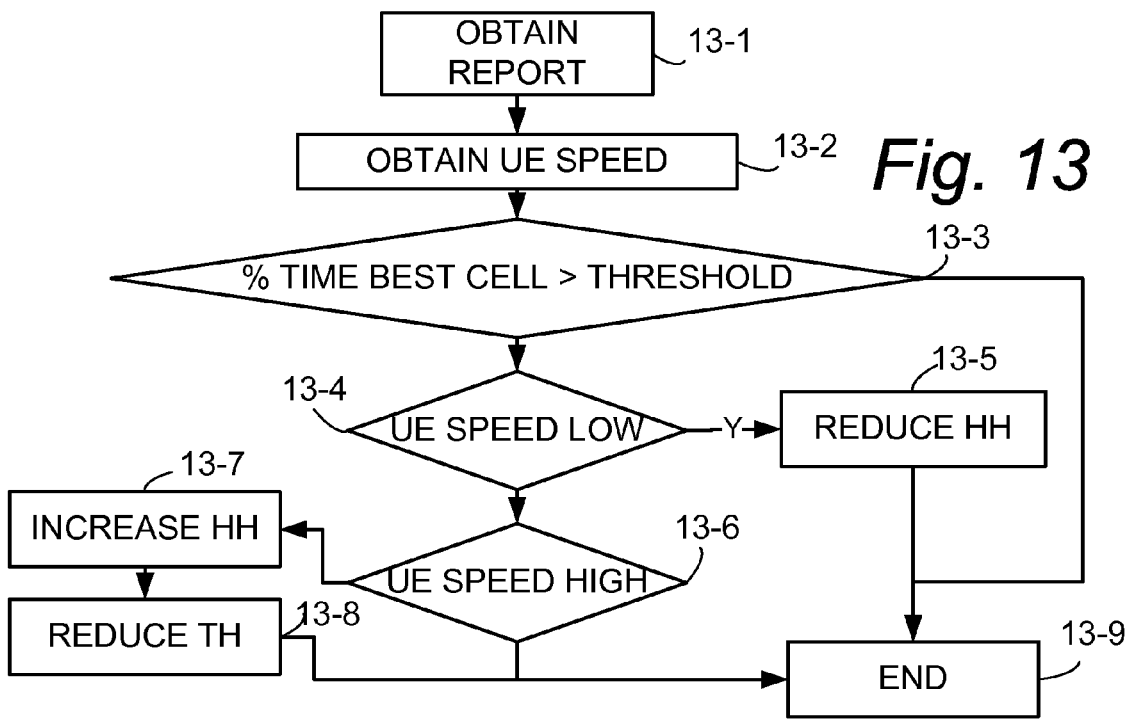
FIG. 13 is a flowchart showing basic acts or steps involved in an example speed-dependent scenario of mobility related parameter adjustment.
Figure 14:
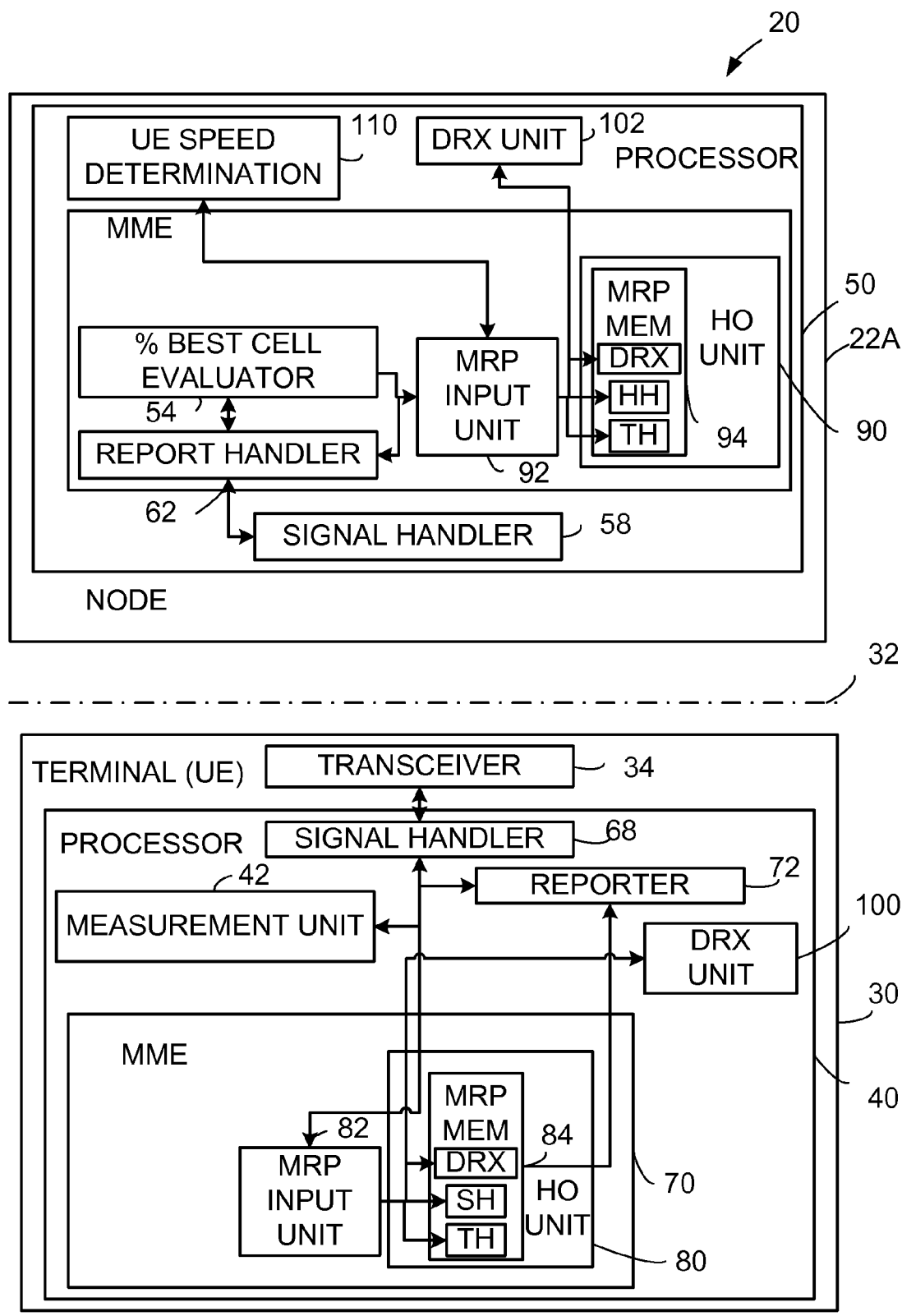
FIG. 14 is a schematic view of an example embodiment wherein a network node comprises a UE speed determination unit.

FIG. 13 illustrates an example speed-dependent scenario of mobility related parameter adjustment. The scenario of FIG. 13 can be employed with a network node such as that illustrated in FIG. 14 which comprises a UE speed determination unit 110. The Act 13-1 comprises receipt of a report of the percentage of time that a terminal is connected to the best cell for the terminal. Act 13-2 comprises obtaining (e.g., from UE speed determination unit 110) the speed of the UE, i.e., the speed of wireless terminal 30. Act 13-3 comprises determining whether the percentage of time that the wireless terminal is not connected to the best cell is higher than a threshold. If the threshold is not exceeded, then the adjustment procedure of FIG. 13 can terminate as act 13-9. If the threshold is exceeded, a check as made as act 13-4 whether the speed of the wireless terminal is too low. If the speed of the wireless terminal is too low, as act 13-5 the hysteresis in received signal value (SH) is reduced. Act 13-6 comprises checking whether the speed of the wireless terminal is too high. If the speed of the wireless terminal is too high, act 13-7 and act 13-8 are performed. Act 13-7 comprises increasing the hysteresis in received signal value (SH); act 13-8 comprises reducing the time hysteresis (TH) before making the handover decision. FIG. 13 thus shows that a mobility related parameter adaptation decision can be made even more robust when combined with knowledge of the speed range with which the wireless terminal is moving. Determination of the speed of wireless terminal 30 can be made by various techniques such as, for example, that explained in 3GPP TS 40.304, "3rd Generation Partnership Project; Technical Specification Group Radio Access Network; Evolved Universal Terrestrial Radio Access (E-UTRA); User Equipment (UE) procedures in idle mode (Release 8)", version 8.2.0, May 2008, §5.2.4.3. Similar mechanisms for getting an estimation of the speed range can be conceived for the connected mode as well, and hence information on speed of the wireless terminal is available at connected mode as well.

Figure 15:
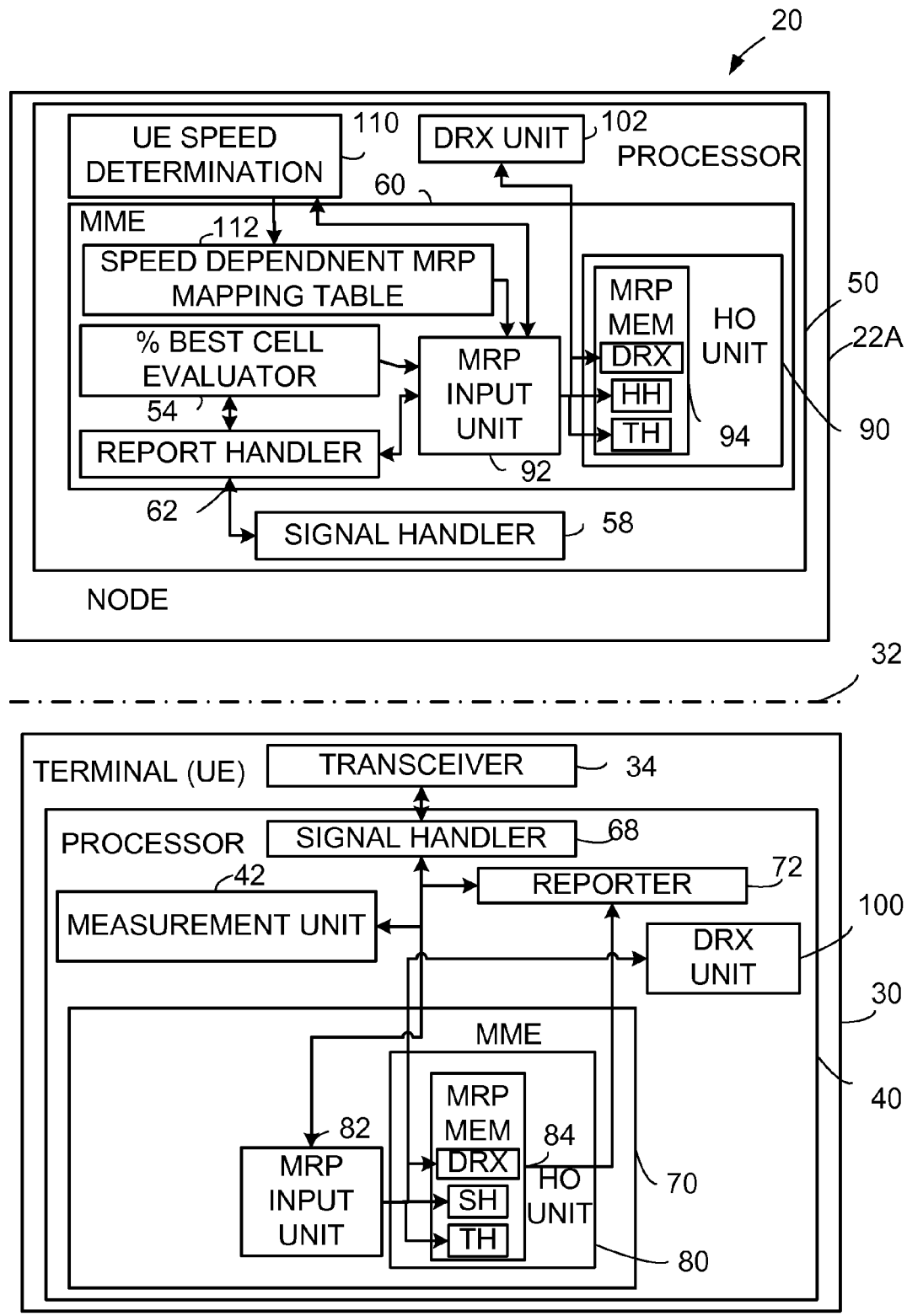
FIG. 15 is a schematic view of an example embodiment wherein a network maintains a list or a mapping table with the appropriate mobility triggering setting(s) per estimated speed and long DRX cycle.

FIG. 15 illustrates an example embodiment wherein the network (e.g., network node 22) maintains a list or a mapping table which maps an appropriate mobility triggering setting (e.g. signal and time hysteresis) to the UE speed and DRX cycle. In particular, FIG. 15 shows mobility management entity 60 as comprising speed dependent MRP mapping table 112. The network can use speed dependent MRP mapping table 112 when a message containing the percentage of time that a terminal is connected to the best cell is transmitted by the wireless terminal. For example, in the speed-dependent idle mode, the MRP update unit 92 can obtain the current speed of the wireless terminal from UE speed determination unit 110, and can then use the obtained current speed as an index into speed dependent mapping table 112 to determine one or more mobility related parameter(s) for the wireless terminal. An example speed dependent mapping table 112 is shown as Table 2.

TABLE 2

SPEED DEPENDENT MRP MAPPING TABLE

| UE speed | Signal hysteresis (SH) | Time hysteresis (TH) | DRX length |
|---|---|---|---|
| $S_1$-$S_2$ km/hr | $SH_1$ | $TH_1$ | $DRX_1$ |
| $S_2$-$S_3$ km/hr | $SH_2$ | $TH_2$ | $DRX_2$ |
| ... | ... | ... | ... |
| $S_{n-1}$-$S_n$ km/hr | $SH_n$ | $TH_n$ | $DRX_n$ |

As previously explained, in some embodiments the wireless terminal is capable of autonomously updating its mobility related parameter(s), such as the mobility management parameters and/or its DRX cycle. In this case the network does not broadcast the mapping table in the cell. Instead UE maintains a pre-defined mapping table. When the wireless terminal makes its own updates for the mobility related parameter, the wireless terminal subsequently notifies the network regarding its new parameters.

Alternatively, the UE can update its mobility management parameters and/or its DRX cycle according to a mapping table broadcasted by the network in the cell. The UE subsequently notifies the network with its new parameters.

Procedures similar to those described for the connected mode can also be envisaged for the cell reselection triggers utilized in the idle mode, namely the Qhyst and Treselection parameters. However, when the wireless terminal is in idle mode, it is not feasible for the wireless terminal to exchange RRC signalling messages with the network node. Therefore another mechanism must be provided for the wireless terminal to know what mobility related parameter value(s) to select when the wireless terminal takes upon itself the responsibility for updating the mobility related parameter(s).

According to one example idle mode option for the wireless terminal to determine the mobility related parameters for itself, the wireless terminal makes an estimation of the new mobility related parameter values (e.g., the new handover "triggers") on the basis of the percentage of time it is not connected to the best cell. In an embodiment of FIG. 16 that utilizes this idle mode option, the network node comprises a downloadable table 114 or list of triggering sets that are dependent upon the percentage of time that the wireless terminal is not connected to the best cell. The downloadable table 114, also known as the percentage not best connected MRP mapping table, specifies the mobility related parameters to be used for various levels of percentages of time the wireless terminal is not connected to the best cell. Table 3 provides an example format of a downloadable table 114.

TABLE 3

PERCENTAGE NOT BEST CONNECTED MRP MAPPING TABLE

| % of time not best connected | Signal hysteresis (SH) | Time hysteresis (TH) | DRX length |
|---|---|---|---|
| $\%_a$-$\%_b$ | $SH_a$ | $TH_a$ | $DRX_a$ |
| $\%_b$-$\%_c$ | $SH_b$ | $TH_b$ | $DRX_b$ |
| ... | ... | ... | ... |
| $\%_{i-1}$-$S_i$ | $SH_i$ | $TH_i$ | $DRX_i$ |

Figure 16:
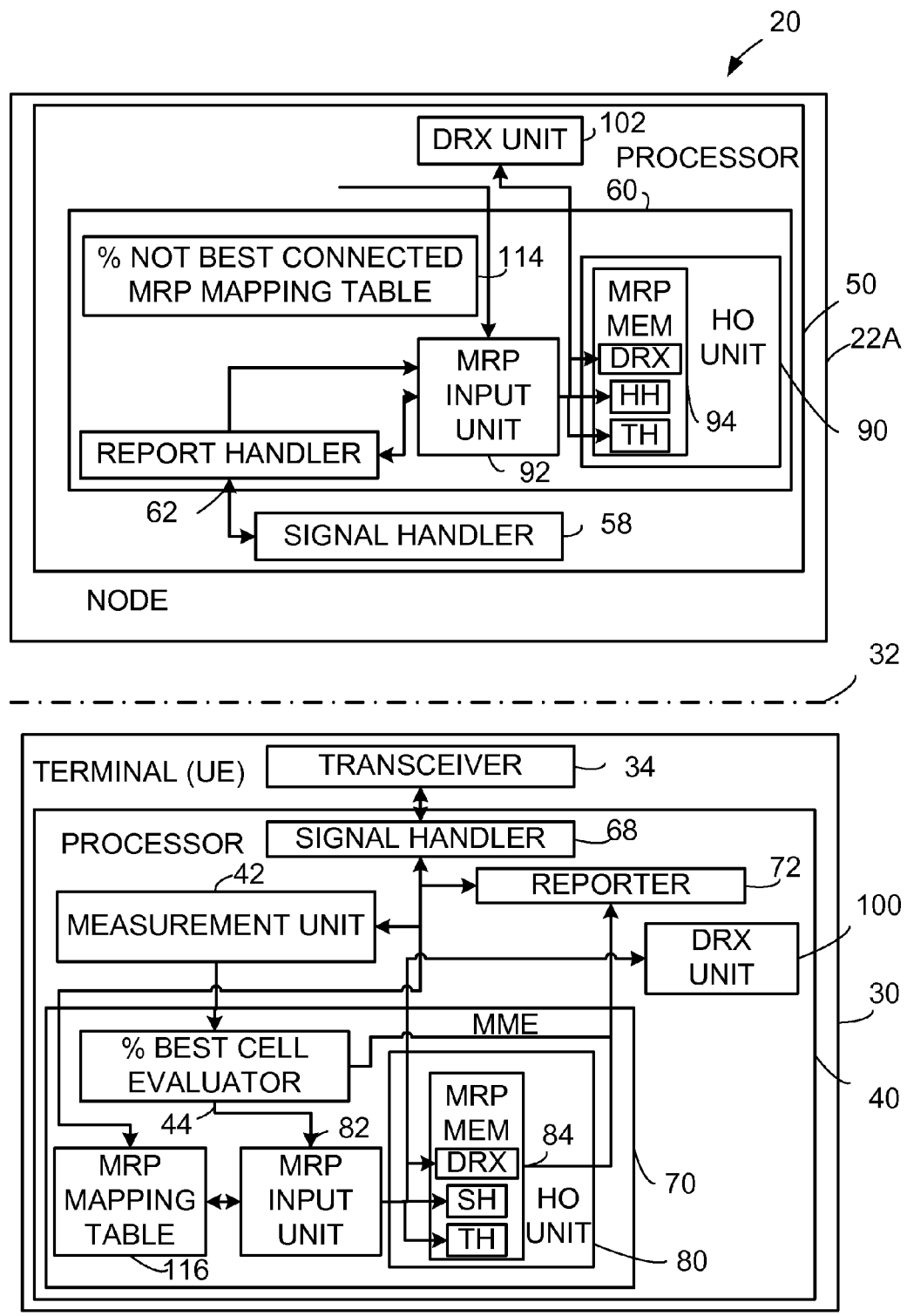
FIG. 16 is a schematic view of an example embodiment of a network having an idle mode option wherein the network node comprises a downloadable table of mobility related parameters that are dependent upon the percentage of time that the wireless terminal is not connected to the best cell.

In the FIG. 16 embodiment the network node broadcasts the percentage not best connected MRP mapping table 114 to wireless terminal, so that the wireless terminal stores the percentage not best connected MRP mapping table 114 in its own MRP mapping table 116. Thus, the wireless terminal is provided with a list of the triggering sets to be used in function of the various levels of these percentages of time the wireless terminal is not connected to the best cell. The MRP update unit 82, knowing from best cell evaluator 44 the percentage of time that a terminal is connected to the best cell for the terminal, can use a complement of the percent as an index to obtain from MRP mapping table 116 the appropriate mobility related parameters, and accordingly can load the mobility related parameters obtained from MRP mapping table 116 into MRP memory 84 of handover unit 80 for use in conjunction with the determination of a next handover. In other words, the wireless terminal applies the setting which corresponds to the measured percentage of time not connected to the best cell. Thus in this FIG. 16 type embodiment the wireless terminal adapts to the network signalled parameters when this event occurs. Preferably the contents of percentage not best connected MRP mapping table 114 are prearranged and pre-agreed among telephone operators/networks, e.g., some level of standardization is needed for, e.g., the signalling of parameters to be adapted in case the percentage of time of a wireless terminal camping on the best cell falls below the threshold.

Generally, several combinations of this measurement, with the DRX long cycle and the speed estimation can be imagined so as to develop mobility management optimization algorithms.

Figure 17:
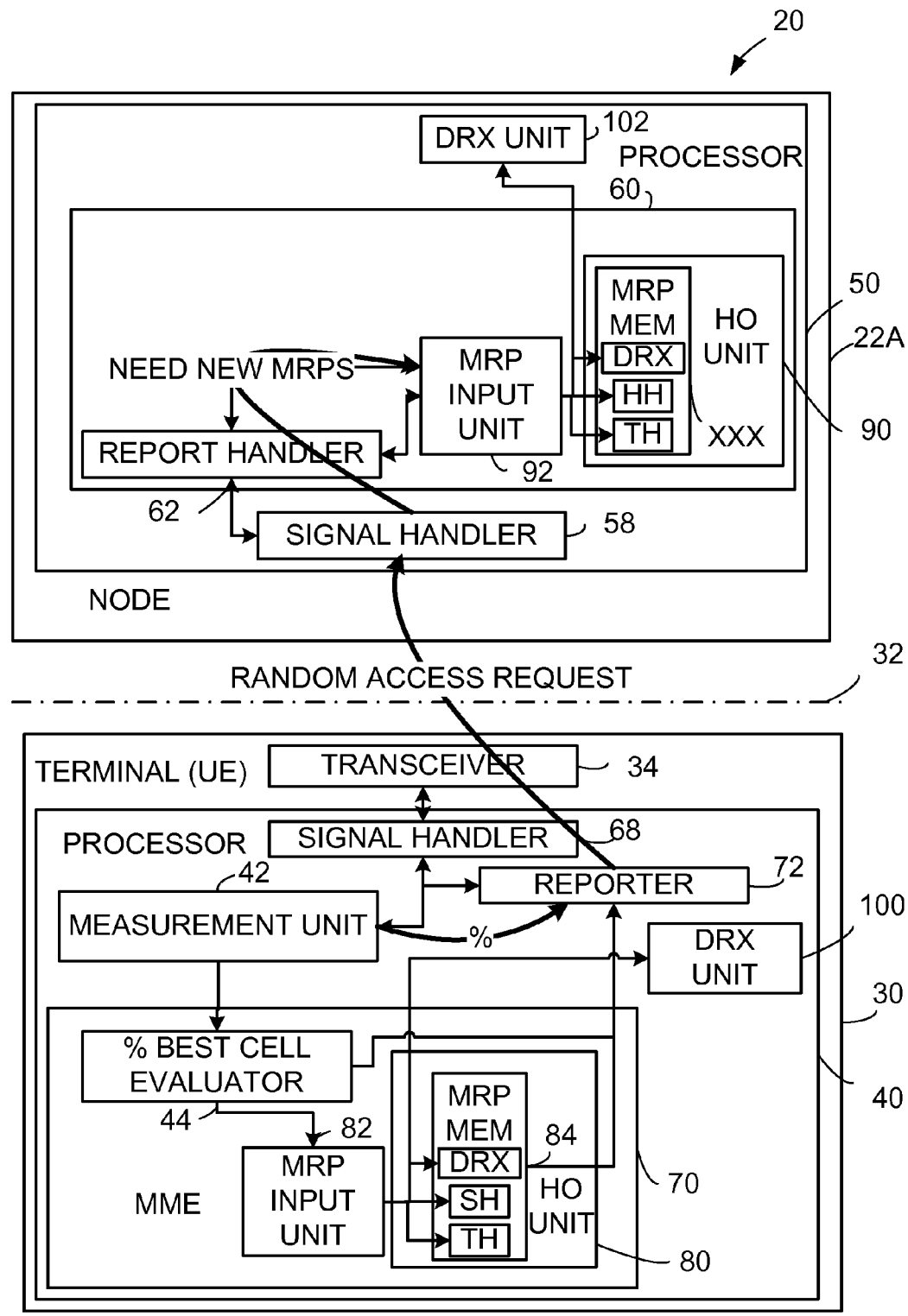
FIG. 17 is a schematic view of an example embodiment of a network comprising a wireless terminal which, when the percentage of time that the wireless terminal is not connected to the best cell becomes very high, sends a random access request (RAQ) to the network.

Another example for terminal in idle mode (for the wireless terminal to determine the mobility related parameters for itself) involves the wireless terminal making a random access request to the network. When (in response to the random access request) the wireless terminal is given permission to transmit (e.g. resources are allocated for uplink transmission), the wireless terminal transmits the percentage time for the best cell (or its converse) to the network so that the network can use the percentage time for the best cell to determine what adjustments need to be made for the mobility related parameter(s). For example, if the percentage of time that the wireless terminal is not connected to the best cell becomes very high, the wireless terminal makes a random access and transmits this percentage information to the network. The MRP update unit 92 of the network node 22 can use the percentage time for the best cell to determine what adjustments need be made for the mobility related parameter(s). FIG. 17 illustrates the best cell evaluator 44 notifying reporter 72 of wireless terminal that the percentage of time that the wireless terminal is not connected to the best cell has become very high, and further illustrates reporter 72 causing sending of a random access request (RAQ) and the percentage value from signal handler 68 of the wireless terminal to signal handler 58 of the network node. The signal handler 68 then directs MRP update unit 92 to update the mobility related parameters according to the reported percentage of time that the terminal is not connected to the best cell for the terminal. The mobility related parameters as updated by MRP update unit 92 are thereafter transmitted to wireless terminal for storage in MRP update unit 82.

Even in connected mode, according to an example embodiment the wireless terminal can estimate a set of handover triggers (e.g., mobility related parameters) and transmit the estimated set of triggers to the network node. This can also be done by using the measurement report RRC message.

Similarly, the information of the percentage of time the wireless terminal is not connected to best cell can be used by the wireless terminal to adapt its mobility management parameters and its DRX cycle. As understood by the person skilled in the art, the discontinuous reception (DRX) cycle defines periodic occasions when the measurements are done. Hence, the discontinuous reception (DRX) cycle defines the periodicity and the granularity in time when mobility measurements such as RSRP measurements are performed. Consequently, the DRX cycle has an impact on the accuracy of mobility measurements such as RSRP measurements, and hence on the handover performance in connected mode and on the cell reselection performance in idle mode.

Figure 18:
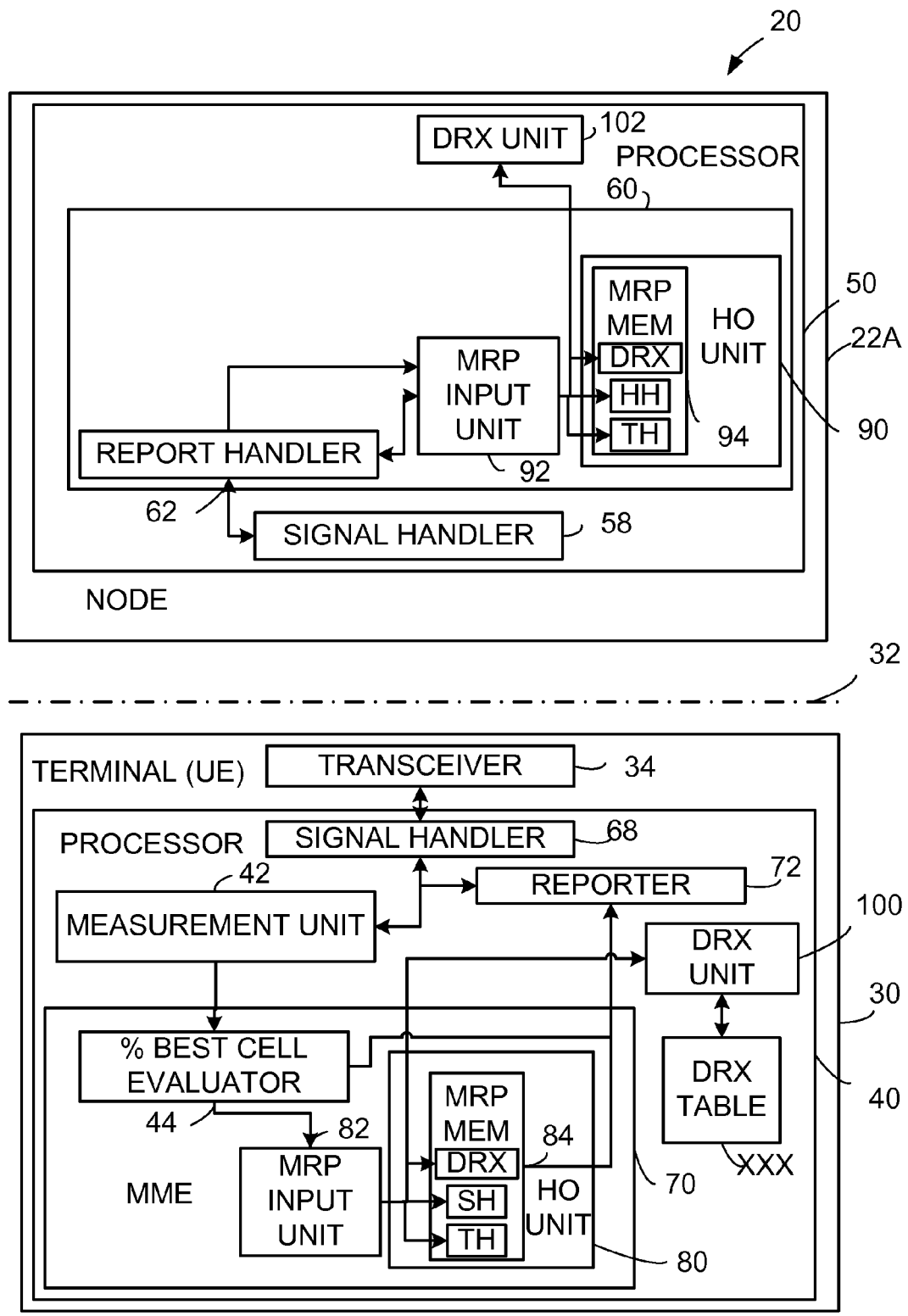
FIG. 18 is a schematic view of an example embodiment of a network wherein a DRX unit of a wireless terminal consults a table of DRX cycle values.

In another example embodiment the wireless terminal can autonomously decide to shorten the discontinuous reception (DRX) cycle. As an example, in case the percentage of the time the wireless terminal is not connected to the best cell is high or above the desired threshold and the DRX long period is also high, then the MRP update unit 82 can autonomously decide to shorten the DRX cycle e.g., the MRP update unit 82 of the wireless terminal can change from a 1.28 sec DRX cycle to a 642 ms DRX cycle. For example, FIG. 18 shows DRX unit 100 of wireless terminal 30 as consulting a table 118 of DRX cycle values (DRX Table 118). The DRX DL Table 118 can either be downloaded from the network to wireless terminal or be (pre)configured at the wireless terminal. For example, in a primitive form the DRX Table 118 can have two DRX cycle values, a first value for a long DRX cycle and a second value for a short DRX cycle. The wireless terminal then can adapt itself to a shorter DRX cycle when the percentage of time that the wireless terminal is not connected to the best cell exceeds the target level. When the percentage fulfils the targets, the wireless terminal can revert to the normal, long or the default cycle. The wireless terminal can also indicate to the network when it has shortened the DRX.

Alternatively if the target percentage of camping to on the best cell is not achieved, then the wireless terminal can progressively shorten its DRX cycle, e.g. from 1.28 s to 642 ms to 320 ms and so on until the target is fulfilled.

Yet in another embodiment the UE does not change the DRX cycle. Rather it simply increases the measurement rates until the best cell camping percentage target is fulfilled, e.g. if the DRX cycle is equal to 20 ms and the measurement rate is 80 msec, it can be reduced to 60, 42 ms or even 20 ms, without changing the DRX cycle.

Advantages of the technology disclosed herein include but are not limited to the following:
Better mobility management performance.
Improved quality of service perceived by the users.
More efficient utilization of the radio resources
Enabling that operators targets are fulfilled on short term basis.

In one of its aspect the technology disclosed herein (i) provides the radio network with knowledge about the percentage of time the terminal is connected to the best cell, and (ii) utilizes this percentage information in the management of parameters having an impact on the performance of handover and cell reselection. Either the network or the wireless terminal can determine (e.g., estimate) the percentage of time that the wireless terminal is connected to best cell.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a communications network comprising a wireless terminal which communicates with a network node, the method comprising:
    using the wireless terminal to perform measurements relative to plural cells of the network;
    using the wireless terminal or the network node to make a determination regarding an extent of connection of the wireless terminal to a best cell of the network;
    using the wireless terminal or the network node to select a mobility related parameter for the wireless terminal in accordance with the determination, the mobility related parameter being an input to a mobility management procedure for determining handover and cell reselection.

2. The method of claim 1, further comprising a wireless terminal reporting to the network node the determination regarding the extent of connection of the wireless terminal to a best cell of the network.

3. The method of claim 1, further comprising using the wireless terminal or the network node to select a mobility related parameter for the wireless terminal in accordance with the determination.

4. The method of claim 3, wherein using the wireless terminal or the network node to select a mobility related parameter for the wireless terminal in accordance with the determination comprises changing a value of a mobility management parameter and then changing a length of a discontinuous reception (DRX) cycle.

5. The method of claim 3, wherein the mobility related parameter comprises a parameter of a discontinuous reception (DRX) cycle.

6. The method of claim 5, further comprising the wireless terminal determining to progressively shorten length of the discontinuous reception (DRX) in accordance with the determination.

7. The method of claim 5, further comprising the network node configuring the wireless terminal with plural discontinuous reception (DRX) cycle values, and wherein the method further comprises the wireless terminal changing between the plural discontinuous reception (DRX) cycle values in accordance with the determination.

8. The method of claim 3, further comprising selecting two mobility management parameters for the wireless terminal in accordance with the determination, and wherein the two mobility management parameters comprise hysteresis of a signal value and time hysteresis before making a handover decision.

9. The method of claim 3, further comprising selecting a mobility management parameter as the mobility related parameter for the wireless terminal in accordance with the determination, and wherein the mobility management parameter comprises a length of an active cycle which defines one or more of (1) filter length of measurements; and (2) periodicity with which measurements of signal strength received from a pilot signal is performed.

10. The method of claim 1, wherein making the determination of the extent of connection comprises determining whether a percentage of time that the wireless terminal is connected to a best cell of the network satisfies a threshold.

11. The method of claim 3, further comprising:
determining a traveling speed of the wireless terminal;
also selecting a value of the mobility management parameter dependent upon the traveling speed.

12. The method of claim 11, further comprising storing at the network node a table configured to map various traveling speeds to corresponding values of the mobility related parameter.

13. The method of claim 3, further comprising estimating the mobility related parameter at the wireless terminal in accordance with the determination.

14. The method of claim 13, further comprising the network node broadcasting differing mobility related parameter values corresponding to differing percentages of time values that the wireless terminal is not connected to the best cell.

15. A node of a communications network which communicates with a wireless terminal, the node comprising:
an interface with the wireless terminal by which the node receives measurements relative to plural cells of the network;
a computer configured to make a determination regarding an extent of connection of the wireless terminal to a best cell of the network and to select a mobility related parameter for the wireless terminal in accordance with the determination, the mobility related parameter being an input to a mobility management procedure for determining handover and cell reselection.

16. The method of claim 15, wherein the computer is configured to make the determination explicitly using the signal strength and/or signal quality measurements reported by the wireless terminal from plural cells of the network.

17. The method of claim 15, wherein the computer is configured to make the determination based on reports received from the wireless terminal wherein the said reports explicitly indicate the extent of connection of the wireless terminal to a best cell of the network.

18. The node of claim 15, wherein the node is a base station node.

19. The node of claim 15, wherein the node is a radio network controller node.

20. The node of claim 15, further comprising a mobility related parameter input unit configured to select a mobility related parameter for the wireless terminal in accordance with the determination.

21. The node of claim 20, wherein the mobility related parameter is a mobility management parameter, and further comprising a handover unit configured to use the mobility management parameter to define when a handover decision is made.

22. The node of claim 20, wherein the mobility related parameter input unit is configured to select two mobility management parameters for the wireless terminal in accordance with the determination, and wherein the two mobility management parameters comprise hysteresis of a signal value and time hysteresis before making a handover decision.

23. The node of claim 20, wherein the mobility related parameter input unit is configured to change a mobility management parameter as the mobility related parameter, and then to change a length of a discontinuous reception (DRX) cycle.

24. The node of claim 20, wherein the mobility related parameter comprises a parameter of a discontinuous reception (DRX) cycle.

25. The node of claim 20, wherein the mobility related parameter input unit is further configured to provide the wireless terminal with plural discontinuous reception (DRX) cycle values so that the wireless terminal can change between the plural discontinuous reception (DRX) cycle values in accordance with the determination.

26. The node of claim 20, wherein the mobility related parameter is a mobility management parameter, and wherein the mobility management parameter comprises a length of an active cycle which defines one or more of (1) filter length of measurements; and (2) periodicity with which measurements of signal strength received from a pilot signal is performed.

27. The node of claim 20, further comprising a wireless terminal speed determination unit configured to determine a traveling speed of the wireless terminal, and wherein the mobility related parameter input unit is configured to select a value of the mobility management parameter dependent upon the traveling speed.

28. A wireless terminal which communicates with a network node of a communications network, the wireless terminal comprising:
a measurement unit configured to perform measurements relative to plural cells of the network;
a computer configured to make a determination regarding an extent of connection of the wireless terminal to a best cell of the network and to select a mobility related parameter for the wireless terminal in accordance with the determination, the mobility related parameter being an input to a mobility management procedure for determining handover and cell reselection.

29. The wireless terminal of claim 28, further comprising a mobility related parameter input unit configured to select a mobility related parameter for the wireless terminal in accordance with the determination.

30. The wireless terminal of claim 29, wherein the mobility related parameter is a mobility management parameter, and wherein the mobility related parameter input unit is further configured to select plural mobility management parameters for the wireless terminal in accordance with the determination, and wherein two mobility management parameters comprise hysteresis of a signal value and time hysteresis before making a handover decision.

31. The wireless terminal of claim 30, wherein the mobility related parameter is a mobility management parameter, and wherein the mobility related parameter input unit is configured to change a value of the MIMO mode and then to change a length of a discontinuous reception (DRX) cycle.

32. The wireless terminal of claim 29, wherein the mobility related parameter comprises a parameter of a discontinuous reception (DRX) cycle.

33. The wireless terminal of claim 32, wherein the mobility related parameter input unit is configured to progressively change length of the discontinuous reception (DRX) in accordance with the determination.

34. The wireless terminal of claim 32, wherein the wireless terminal is configured to receive plural discontinuous reception (DRX) cycle values from the network node, and wherein the mobility related parameter input unit is configured to change between the plural discontinuous reception (DRX) cycle values in accordance with the determination.

35. The wireless terminal of claim 29, wherein the mobility related parameter is a mobility management parameter, and wherein the mobility management parameter comprises a length of an active cycle which defines one or more of (1) filter length of measurements; and (2) periodicity with which measurements of signal strength received from a pilot signal is performed.

36. The wireless terminal of claim 29, wherein the mobility related parameter input unit is configured to estimate the mobility related parameter at the wireless terminal in accordance with the determination.

37. The wireless terminal of claim 29, wherein when the wireless terminal is configured, when in idle mode, to make a random access request and, upon granting of the random access request, to transmit a measurement report to the network node regarding the extent of connection of the wireless terminal to the best cell of the network.

* * * * *

UNITED STATES PATENT AND TRADEMARK OFFICE
CERTIFICATE OF CORRECTION

PATENT NO. : 8,229,434 B2
APPLICATION NO. : 12/475953
DATED : July 24, 2012
INVENTOR(S) : Kazmi et al.

It is certified that error appears in the above-identified patent and that said Letters Patent is hereby corrected as shown below:

On the Title Page, Item (75), under "Inventors", Line 3, delete "Bjäred" and insert -- Bjärred --, therefor.

In the Specifications

In Column 3, Line 12, delete "cycles" and insert -- cycles. --, therefor.

In Column 3, Line 16, delete "cycles" and insert -- cycles. --, therefor.

In Column 8, Line 6, below "terminal.", insert -- Fig. 1A is a schematic view of an example communications network according to Fig. 1 wherein a network node is a base station node. --
and insert
-- Fig. 1B is a schematic view of an example communications network according to Fig. 1 wherein a network node is a radio network controller (RNC) node. --.

In Column 8, Line 8, delete "network" and insert -- network. --, therefor.

In Column 8, Line 12, below "terminal.", insert -- Fig. 3A is a schematic view of an example communications network according to Fig. 3 wherein a network node is a base station node. --
and insert
-- Fig. 3B is a schematic view of an example communications network according to Fig. 3 wherein a network node is a radio network controller (RNC) node. --.

In Column 13, Line 59, Expression (1), delete "(RSM1, RSM2," and
insert -- ($RSM_1$, $RSM_2$, --, therefor at each occurrence throughout the specification.

In Column 14, Line 58, Expression (3), delete "β" and insert -- γ --, therefor.

In Column 16, Line 55, delete "30a." and insert -- 30A. --, therefor.

Signed and Sealed this
Twenty-third Day of July, 2013

Teresa Stanek Rea
*Acting Director of the United States Patent and Trademark Office*

CERTIFICATE OF CORRECTION (continued)
U.S. Pat. No. 8,229,434 B2

In Column 16, Line 63, delete "30a." and insert -- 30A. --, therefor.

In Column 16, Line 64, delete "22b" and insert -- 22B --, therefor.

In Column 23, Line 46, delete "to on" and insert -- on --, therefor.

In Column 23, Line 60, delete "resources" and insert -- resources. --, therefor.

In the Claims

In Column 25, Line 55, in Claim 16, delete "method" and insert -- node --, therefor.

In Column 25, Line 59, in Claim 17, delete "method" and insert -- node --, therefor.